United States Patent
Lee

(10) Patent No.: US 11,550,502 B2
(45) Date of Patent: Jan. 10, 2023

(54) APPARATUS AND METHOD FOR CONTROLLING MULTI-STREAM PROGRAM OPERATIONS PERFORMED IN A MEMORY BLOCK INCLUDED IN A MEMORY SYSTEM

(71) Applicant: SK hynix Inc., Icheon-si (KR)

(72) Inventor: Seok-Jun Lee, Seoul (KR)

(73) Assignee: SK hynix Inc., Icheon-si (KR)

( * ) Notice: Subject to any disclaimer, the term of this patent is extended or adjusted under 35 U.S.C. 154(b) by 61 days.

(21) Appl. No.: 16/859,976

(22) Filed: Apr. 27, 2020

(65) Prior Publication Data
US 2021/0096772 A1 Apr. 1, 2021

(30) Foreign Application Priority Data
Oct. 1, 2019 (KR) .................. 10-2019-0121706

(51) Int. Cl.
*G06F 3/06* (2006.01)

(52) U.S. Cl.
CPC .......... *G06F 3/0659* (2013.01); *G06F 3/0604* (2013.01); *G06F 3/064* (2013.01); *G06F 3/0652* (2013.01); *G06F 3/0673* (2013.01)

(58) Field of Classification Search
CPC ...... G06F 3/0659; G06F 3/0604; G06F 3/064; G06F 3/0652; G06F 3/0673; G06F 3/061; G06F 3/0679; G06F 3/0616; G06F 3/0658; G06F 3/0626; G06F 12/0253; G11C 16/105
USPC ...... 710/39, 56; 711/154, 170; 707/813, 693
See application file for complete search history.

(56) References Cited

U.S. PATENT DOCUMENTS

| | | | | | |
|---|---|---|---|---|---|
| 5,414,826 | A | * | 5/1995 | Garcia | G06F 12/0223 711/E12.005 |
| 5,586,285 | A | * | 12/1996 | Hasbun | G06F 3/0601 711/170 |
| 5,937,434 | A | * | 8/1999 | Hasbun | G06F 12/023 711/170 |
| 7,654,466 | B2 | | 2/2010 | Maeda | |
| 8,514,621 | B2 | | 8/2013 | Choi et al. | |
| 8,842,472 | B2 | | 9/2014 | Kim | |
| 2001/0013269 | A1 | * | 8/2001 | Tanji | G11B 27/105 84/601 |
| 2013/0205073 | A1 | * | 8/2013 | Hwang | G06F 3/0649 711/103 |
| 2015/0277792 | A1 | * | 10/2015 | Ma | G06F 3/0679 711/103 |
| 2017/0277476 | A1 | * | 9/2017 | Shin | G06F 3/061 |
| 2018/0165191 | A1 | * | 6/2018 | Lin | G06F 3/0679 |
| 2019/0102083 | A1 | * | 4/2019 | Dusija | G06F 3/0679 |
| 2019/0196966 | A1 | * | 6/2019 | Hwang | G06F 12/0253 |
| 2019/0377494 | A1 | * | 12/2019 | Rao | G06F 12/0246 |
| 2020/0097403 | A1 | * | 3/2020 | Saxena | G06F 12/0246 |

\* cited by examiner

*Primary Examiner* — William E. Baughman
(74) *Attorney, Agent, or Firm* — Perkins Coie LLP

(57) ABSTRACT

A memory includes a memory device including plural memory blocks, each memory block including plural pages, and a controller coupled to the memory device and configured to select a target memory block among the plural memory blocks, the target memory block including a first page to an N page (N is a positive integer), and program data in the target memory block, based on a type of the data, either in a first direction from the first page to the N page or in a second direction from the N page to the first page.

18 Claims, 10 Drawing Sheets

APPARATUS AND METHOD FOR CONTROLLING MULTI-STREAM PROGRAM OPERATIONS PERFORMED IN A MEMORY BLOCK INCLUDED IN A MEMORY SYSTEM

CROSS-REFERENCE TO RELATED APPLICATIONS

This patent document claims priority to and benefits of Korean Patent Application No. 10-2019-0121706, filed on Oct. 1, 2019, the entire disclosure of which is incorporated herein by reference.

TECHNICAL FIELD

The technology and implementations disclosed in this patent document relate to a memory system and a data processing system including the memory system. Some implementations of the disclosed technology relate to a method and apparatus for providing a multi-stream operation in the memory system.

BACKGROUND

Recently, a paradigm for a computing environment has shifted to ubiquitous computing, which enables computer systems to be accessed anytime and everywhere. As a result, the use of portable electronic devices, such as mobile phones, digital cameras, notebook computers or others, are rapidly increasing. Such portable electronic devices generally include a data storage device operating together with a memory device. The data storage device can be used as a main storage device or an auxiliary storage device of a portable electronic device.

The data storage device operating with a nonvolatile semiconductor memory device does not need a mechanical driving unit and thus has an excellent stability and durability. In addition, it is possible to quickly access information, and power consumption is low. Examples of data storage device having such advantages include a data storage device that includes a USB (Universal Serial Bus) memory device, a memory card having various interfaces, a solid state drive (SSD), or others.

SUMMARY

Some implementations of the disclosed technology relate to a data process system and a method for operating the data processing system, which includes components and resources such as a memory system and a host and is capable of dynamically allocating plural data paths used for data communication between the components based on usages of the components and the resources. Some implementations of the disclosed technology relate to an apparatus and a method which is capable of programming pieces of data in different non-volatile memory blocks based on types, attributes or characteristics of data, so as to improve or enhance an operation for reading a piece of data stored in the memory block, maintaining and managing the piece of data in the memory block or controlling a usage, a lifespan or others regarding a plurality of memory blocks included in the memory system.

Some implementations of the disclosed technology relate to a memory system supporting a multi-stream operation corresponding to types, attributes or characteristics of data stored in the memory system, that the suggested implementation can also avoid increasing the number of open memory blocks in the memory device while performing the multi-stream operation. Accordingly, operating performance and efficiency of the memory system can be improved. Some implementations of the disclosed technology relate to an apparatus and method for performing a multi-stream operation of programming pieces of data to be programmed bidirectionally in a single open memory block so as to thereby reduce the number of open memory blocks in the memory device.

In one aspect, a memory system can include a memory device including plural memory blocks, each memory block including plural pages; and a controller coupled to the memory device and configured to select a target memory block among the plural memory blocks, the target memory block including a first page to an N page (N is a positive integer larger than 4) and program data in the target memory block, based on a type of the data, either in a first direction from the first page to the N page or in a second direction from the N page to the first page.

In some implementations, the controller can be configured to select the target memory block based on an attribute of the data. In some implementations, the type of the data may be determined based on whether the data is user data or meta data, and the attribute of the data may be determined as one of hot, warm, or cold based on a frequency to access to the data. In some implementations, the type of the data is determined based on whether the data is user data or meta data, and the attribute of the data may be determined as long or short based on a frequency to update the data.

In some implementations, the controller can be configured to program a piece of the data in the first direction and program another piece of the data in the second direction. In some implementations, the controller is further configured to check during the programming of the data whether more than one empty page in which no data is programmed exists in the target memory block, and in response to a check result that there is not more than one empty page in the target memory block, the controller is further configured to select another target memory block among the plural memory blocks. In some implementations, the controller is further configured to select a victim memory block among the plural memory blocks and perform a garbage collection operation on data stored in the victim memory block based on at least one of a type or an attribute of the data.

In some implementations, the controller is further configured to move the data stored in the victim memory block to either a first open memory block or a second open memory block depending on the data has been programmed in the first direction or the second direction. In some implementations, the controller is further configured to check whether all pages in the first open memory block are programed. In some implementations, the controller is further configured to select another victim memory block among the plural memory blocks in a response to a checking result that there is a blank page in the first open memory block, and perform the garbage collection on data stored in another victim memory block.

In another aspect, a method for operating a memory system is provided. The method comprises: selecting a target memory block among plural memory blocks, each memory block including plural pages; and performing a program operation to program data in the target memory block based on a type of the data either in a first direction from a first page to an N page (N is a positive integer) of the target memory block or in a second direction from the N page to the first page.

In some implementations, the method further comprises: determining the type of the data based on whether the data is user data or meta data. In some implementations, the method further comprises: determining an attribute of the data inputted with a request for the program operation. In some implementations, wherein the determining of the attribute of the data is made based on a frequency to access the data or a frequency to update the data. In some implementations, wherein the performing of the program operation includes programming a piece of data in the first direction and programming another piece of data in the second direction. In some implementations, the method further comprises: determining whether the target memory block includes more than one empty page in which no data is programmed, and selecting, in response to the determination that target memory block includes not more than one empty page, another target memory block among the plural memory blocks.

In some implementations, the method further comprises: selecting a victim memory block among the plural memory blocks; and performing a garbage collection operation on pieces of data stored in the victim memory block based on at least one of types or attributes of the pieces of data. In some implementations, wherein the performing of the garbage collection operation includes moving some pieces of data into a first open memory block or a second open memory block depending on the pieces of data have been programmed in the first direction or the second direction. In some implementations, the method further comprises: determining whether all pages in the first open memory block are programed. In some implementations, the method further comprises: selecting, in response to the determining that there is a blank page in the first open memory block, another victim memory block among the plural memory blocks; and performing the garbage collection on pieces of data stored in the another victim memory block.

BRIEF DESCRIPTION OF THE DRAWINGS

The description herein makes reference to the accompanying drawings wherein like reference numerals refer to like parts throughout the figures.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

DETAILED DESCRIPTION

Various embodiments of the disclosure are described below in with reference to the accompanying drawings. Elements and features of the disclosure, however, may be configured or arranged differently to form other embodiments, which may be variations of any of the disclosed embodiments.

Embodiments of the disclosed technology will now be described with reference to the accompanying drawings, wherein like numbers reference like elements.

Figure 1:
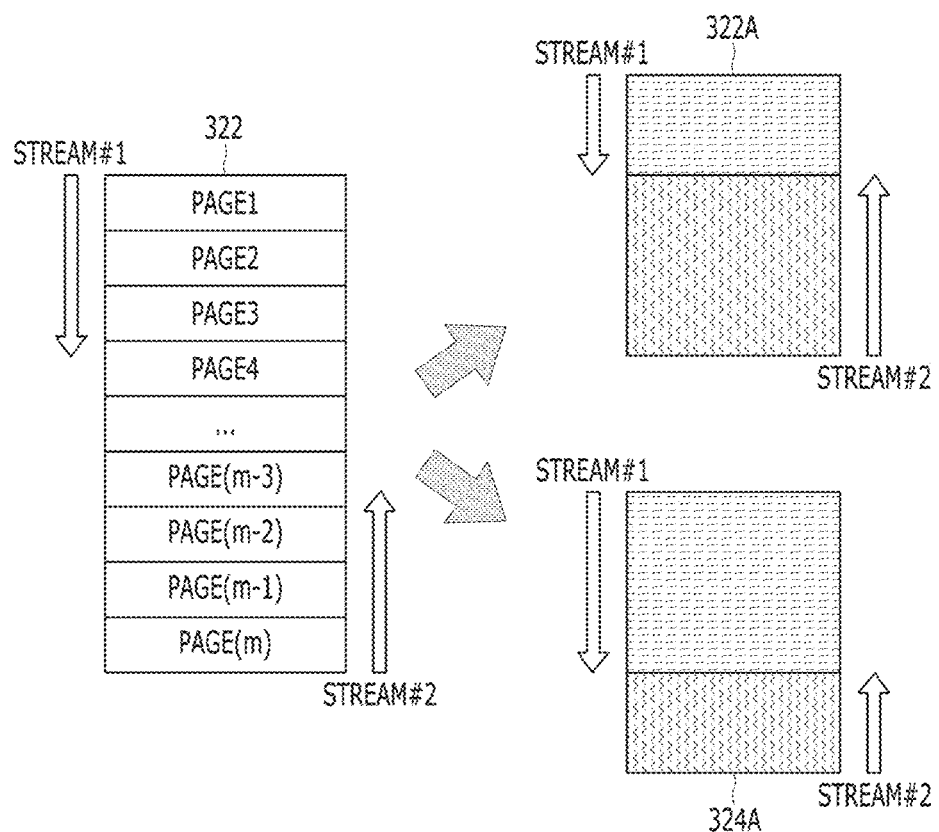
FIG. 1 illustrates a multi-stream operation in a memory system in accordance with an embodiment of the disclosed technology.

FIG. 1 illustrates a multi-stream operation in a memory system in accordance with an embodiment of the disclosed technology.

Referring to FIG. 1, the memory system includes non-volatile memory cells that form a memory block 322 which may include or be configured as a plurality of pages PAGE1 to PAGE(m). In implementations, the memory system may be controlled so that data stored in the non-volatile memory cells in a memory block may be erased together and pages PAGE1 to PAGE(m) in the memory block 332 might not be independently erased. While the operation for erasing data may be performed in a unit of the memory block 322, an operation for storing or reading a piece of data may be selectively performed in a selected unit of page. A selected page to be written/programed or to be read out includes a group of non-volatile memory cells where a program or read operation is performed together. For example, the memory system may independently or separately store a piece of data in each of the plurality of pages PAGE1 to PAGE(m) in the memory block 322, and one of the plurality of pages PAGE1 to PAGE (m) may be selected to read the stored data. In the example in FIG. 1, the memory system may include a plurality of memory blocks similar to the example memory block 322 that is specifically illustrated in FIG. 1. Depending on configuration and design of the memory system, the plurality of memory blocks 322 may be included in a larger group such as a plane, a die or a chip. The configuration of the memory system may vary according to an embodiment described below with reference to FIGS. 2 to 6.

In the multi-stream operation in the memory system, tasks for programming pieces of data in the memory system may be divided or classified into plural streams based on different data attributes, and the plural streams may be individually performed in different locations in the memory system. In general, in order to support plural streams for write operations, a plurality of open memory blocks may be utilized. For example, each stream may be independently performed in each open memory block. The pages in a memory system for a multi-stream operation can include open memory blocks and closed memory blocks. An open memory block refers to a memory block that can store and program data in its page without undergoing an erase operation. A closed memory block is distinguished from an open block and is a memory block in which data has been programmed in all the pages and thus data cannot be programmed or written into the memory block without an erase operation.

The memory system may use and control a plurality of open memory blocks to improve performance regarding a write operation. However, as the number of open memory blocks increases, overloads may occur in an internal operation of the memory system. Accordingly, there may be some limitations on the number of open memory blocks used in the memory system in light of the overloads increased based on the number of the open memory blocks and the need to improve the performance of the memory system. For example, when the attribute of data is determined based on an access frequency of data, it may be determined that the frequently accessed data, the less frequently accessed data, and data with access frequency that is neither frequent not less have hot, cold, and warm attributes, respectively. To program pieces of data having three different data attributes in different memory blocks, at least three open memory blocks may be needed for storing the pieces of data. In the memory system, when the pieces of data (user data) are stored in different memory blocks separately from pieces of meta data corresponding to the pieces of user data, at least six open memory blocks may be required. Increasing the number of open memory blocks, however, may cause overheads deteriorating the performance of the memory system.

In an embodiment, the memory system may use a super block (or super memory block) scheme. In the super block scheme, plural memory blocks located in different dies or planes are used together for programming pieces of data. Herein, a super block is a virtual group or a logical group including plural memory blocks associated with each other for a data program operation. Plural pieces of data are together programmed in each memory block of the super block for reducing an operation time for programming the plural pieces of data. In the super block scheme, when a piece of data is programmed based on characteristics or attributes of data, the number of open memory blocks in the memory system may be dramatically increased, which causes fatal overheads.

When a data attribute is classified based on an update period of the piece of data, the data attribute may be determined as one of long and short. Herein, the data attribute of long may indicate a case when a corresponding piece of data is not frequently modified or changed (less frequently than a reference), and the data attribute of short may shows a case where a corresponding piece of data is frequently modified and changed (more frequently than a reference).

In order to improve a lifespan of the memory block 322, the memory block 322 may be allocated based on the data attribute. Further, as the data attribute are fractionized, the number of open memory block 322 allocated for programming pieces of data may be increased. In addition, in a memory system supporting a super block scheme, it is necessary to allocate a lot of open memory block 322 based on the data attribute in each die or plane. Further, when user data and meta data corresponding to the user data are divided and stored in different memory blocks of the memory system, the number of open memory blocks may be doubled. Even though performance may depend on an internal configuration of the memory system, the number of open memory blocks controlled by the memory system may be increased as a larger amount of data is stored together in the memory system or a better write performance is required in the memory system. However, the more open memory blocks, the more overheads such as operational burdens.

Referring to FIG. 1, unlike a memory block included in a conventional memory system, two streams STREAM #1, STREAM #2, which proceed in different directions, may be supported in the memory block 322. In a conventional memory block, pieces of data are sequentially programmed either in a first direction from the first page PAGE1 to the last page PAGE(m) or in a second direction from the last page PAGE(m) to the first page PAGE1. However, the memory block 322 according to an embodiment of the disclosed technology may support a plurality of streams that are programmed in different directions from each other. The memory block 322 may include a plurality of non-volatile memory cells and may be considered a group of the non-volatile memory cells erased together. Each page PAGE1 to PAGE(m) may include a plurality of non-volatile memory cells and may be considered a group of the non-volatile memory cells programmed or read together. Thus, the memory block 322 corresponds to a unit of memory cells to which an erase operation is applied, and a page corresponds to a unit of memory cells to which a programming operation or a read operation is applied. For example, when the memory block 322 includes four or more pages, a first type of data may be sequentially programmed in a direction of the first page to the fourth page STREAM #1, and a second type of data may be sequentially programmed in the other direction of the fourth page to the first page STREAM #2. Tasks for the streams STREAM #1, STREAM #2 may include information that can distinguish or point to a physical location for data input/output in the memory system.

According to an embodiment of the disclosed technology, the memory block 322 may support a bidirectional data program operation. In detail, the memory block 322 may support a first stream STREAM #1 in which plural pieces of data are sequentially programmed in the first direction from the first page PAGE1 to the last page PAGE(m), and a second stream STREAM #2 in which plural pieces of data are sequentially programmed in the second direction from the last page PAGE(m) to the first page PAGE1.

A single memory block 322 may support a plurality of streams, which may be distinguishable from a method for dividing one memory block into a plurality of units, each unit supporting only one stream. When one memory block is divided into a plurality of units, the size of each unit can be fixed. Even though one stream is supported in each unit, the program operation may be performed in the same manner and in the same direction for each unit for increasing operational efficiency.

In an embodiment, a stream (or a data stream) may be implemented with a data input/output circuitry coupled to the memory block. For example, for supporting a multi-stream, a memory block may be coupled to two or more buffers (e.g., page buffers), each configured to temporarily hold or store a piece of data before the piece of data is programmed at a page of the memory block. After two pieces of data are transferred into two buffers, the two pieces of data may be programmed consecutively in the memory block. When plural pieces of data are stored in each of the two buffers, pieces of data stored in a first buffer of the two buffers are programmed first and other pieces of data stored in a second buffer of the two buffers are programmed later. In another example, pieces of data stored in the two buffers may be alternatively programmed in the memory block. After a first piece of data in the first buffer is programmed at a page in the memory block, a first piece of data in the second buffer may be programmed at another page in the memory block. Then, after the first piece of data in the second buffer is programmed, a second piece of data in the first buffer may be programmed in another page following the page where the first piece of data in the first buffer was programmed.

In another embodiment, a multi-stream may be implemented with a single buffer or a single queue. The single buffer or a single queue may be coupled to different locations (i.e., pages) of the memory block in a time-division way. For example, the single buffer may transfer a piece of data into a first region of the memory block at a first time via a first stream, and transfer another piece of data into a second region of the memory block at a second time later than the first time via a second stream.

In an embodiment, when the memory block 322 supports a plurality of streams, a data program operation performed through a plurality of streams may be carried out in a plurality of directions, starting from different locations of the memory block 322. Amounts of data programmed through the plurality of streams may not be identical. For example, referring to FIG. 1, in a case of a first memory block 322A which is capable of supporting a plurality of streams, i.e., a first stream STREAM #1 and a second stream STREAM #2, the amount of data stored via the second stream STREAM #2 may be larger than the amount of data stored via the first stream STREAM #1. In another example, in a second memory block 324A capable of supporting a plurality of streams, i.e., the first stream STREAM #1 and the second stream STREAM #2, the amount of data stored via the first stream STREAM #1 may be larger than the amount of data stored via the second stream STREAM #2.

According to an embodiment, the memory block 322 may support a plurality of streams STREAM #1, STREAM #2, and the amounts of data programmed through each stream may be varied. Thus, the memory block 322 may be not previously divided into plural regions each including data programmed via each of the plurality of streams STREAM #1, STREAM #2. Sizes of the plural regions in the memory block 322 may be determined dynamically while plural pieces of data are programmed via the plurality of streams STREAM #1, STREAM #2. Further, the memory system can check whether there are any pages that are empty (blank pages where data is not yet written) before pieces of data are programmed through each of the streams STREAM #1, STREAM #2.

Different types of data may be programmed via two streams STREAM #1, STREAM #2 in the memory block 322. For example, when user data is sequentially programmed or stored through the first stream STREAM #1, meta data corresponding to the user data may be sequentially programmed or stored via the second stream STREAM #2. In another example, when the user data is sequentially programmed or stored through the second stream STREAM #2, the meta data corresponding to the user data may be sequentially stored or programmed in the first stream STREAM #1.

When different types of data are programmed in the single memory block 322 via two streams STREAM #1, STREAM #2, the number of open memory blocks which the memory system controls can be halved, as compared with a conventional way where a single memory block of the memory system supports a single stream. In an embodiment, a piece of user data and a piece of meta data, which are stored in the memory block 322, may have a preset size based at least on configurations and operation characteristics of the memory system. In this case, it may be easier to control two streams STREAM #1, STREAM #2 in the memory block 322 because sizes of regions each allocated for two streams can be fixed. In another embodiment, even if sizes of the user data and the meta data may be changed in each of write operations in the memory system, the memory system might not reserve each of the regions where data is programmed via each of two streams STREAM #1, STREAM #2 in the memory block 322. Because each region can be allotted dynamically, the memory block 322 may be used more efficiently.

Hereinafter, referring to FIGS. 2 to 3, a memory system 110 including a memory device 150 including plural memory blocks such as the memory block 322 shown in FIG. 1 and a controller 130 configured to program pieces of data in the memory device 150 will be described in more detail.

Hereinafter, referring to FIGS. 2 and 3, some operations performed by the memory system 110 are described in detail.

Figure 2:
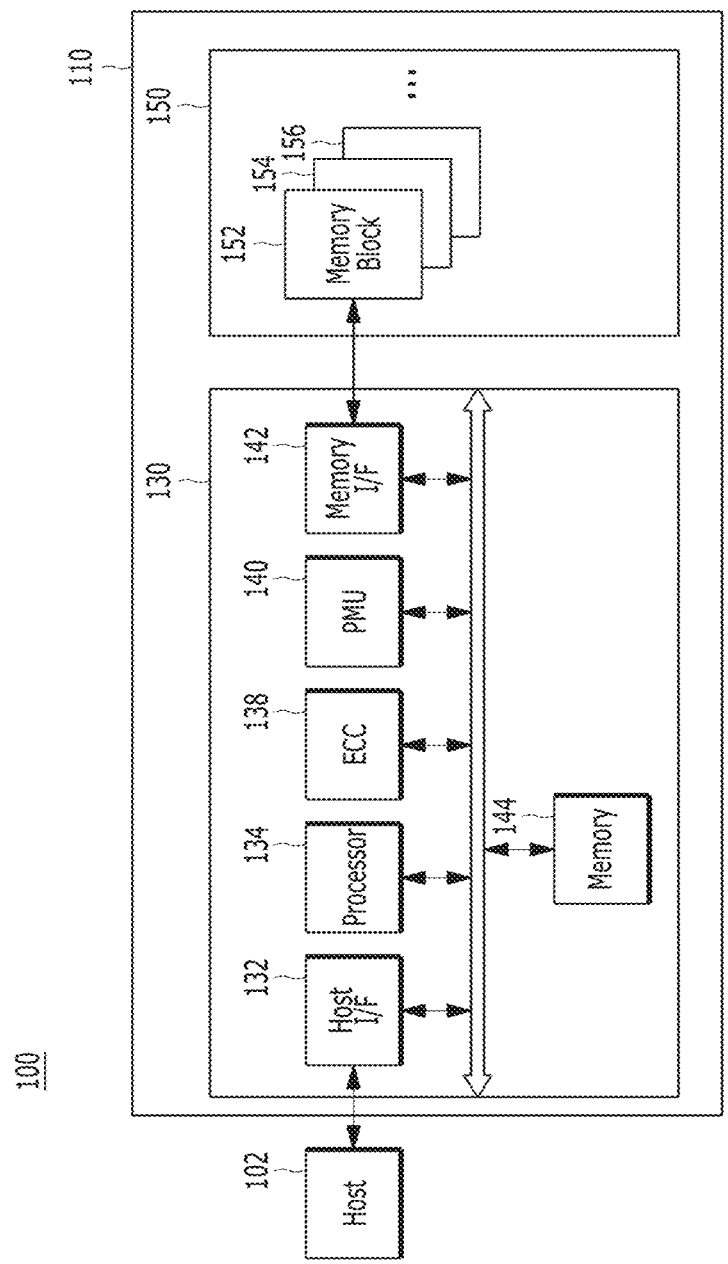
FIG. 2 shows a data processing system including a memory system in accordance with another embodiment of the disclosed technology.

Referring to FIG. 2, a data processing system 100 in accordance with an embodiment of the disclosed technology is described. Referring to FIG. 2, the data processing system 100 may include a host 102 engaged or interlocked with a memory system 110.

The host 102 may include, for example, a portable electronic device such as a mobile phone, an MP3 player and a laptop computer, or a non-portable electronic device such as a desktop computer, a game player, a television (TV), a projector, or others.

The host 102 also includes at least one operating system (OS), which can generally manage, and control, functions and operations performed in the host 102. The OS can provide interoperability between the host 102 engaged with the memory system 110 and the user needing and using the memory system 110. The OS may support functions and operations corresponding to user's requests. By the way of example but not limitation, the OS can be classified into a general operating system and a mobile operating system according to mobility of the host 102. The general operating system may be split into a personal operating system and an enterprise operating system according to system requirements or a user's environment. But the enterprise operating systems can be specialized for securing and supporting high performance. The mobile operating system may be subject to support services or functions for mobility (e.g., a power saving function). The host 102 may include a plurality of operating systems. The host 102 may execute multiple operating systems interlocked with the memory system 110, corresponding to a user's request. The host 102 may transmit a plurality of commands corresponding to the user's requests into the memory system 110, thereby performing operations corresponding to commands within the memory system 110.

The controller 130 in the memory system 110 may control the memory device 150 in response to a request or a command inputted from the host 102. For example, the controller 130 may perform a read operation to provide a piece of data read from the memory device 150 for the host 102, and perform a write operation (or a program operation) to store a piece of data inputted from the host 102 in the memory device 150. In order to perform data input/output (I/O) operations, the controller 130 may control and manage various operations to read, program, erase data or others.

In an embodiment, the controller 130 can include a host interface 132, a processor 134, error correction circuitry 138, a power management unit (PMU) 140, a memory interface 142, and a memory 144. Components included in the controller 130 described in FIG. 2 may vary according to an implementation form, an operation performance, or the like regarding the memory system 110. For example, the memory system 110 may be implemented with any one of various types of storage devices, which may be electrically coupled with the host 102, according to a protocol of a host interface. Non-limiting examples of suitable storage devices include a solid state drive (SSD), a multimedia card (MMC), an embedded MMC (eMMC), a reduced size MMC (RS-MMC), a micro-MMC, a secure digital (SD) card, a mini-SD, a micro-SD, a universal serial bus (USB) storage device, a universal flash storage (UFS) device, a compact flash (CF) card, a smart media (SM) card, a memory stick, or others. Components in the controller 130 may be added or omitted based at implementation of the memory system 110.

As used in the disclosed technology, the term 'circuitry' refers to at least one of the following: (a) hardware-only circuit implementations (such as implementations in only analog and/or digital circuitry) or (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) or (c) to circuits, such as a microprocessor(s) or a portion of a microprocessor(s), that require software or firmware for operation, even if the software or firmware is not physically present. As a further example, as used in this application, the term "circuitry" also covers an implementation of merely a processor (or multiple processors) or portion of a processor and its (or their) accompanying software and/or firmware. The term "circuitry" also covers, for example, and if applicable to a particular claim element, an integrated circuit for a storage device.

The host 102 and the memory system 110 may include a controller or an interface for transmitting and receiving a signal, a piece of data, or others, under a predetermined protocol. For example, the host interface 132 in the memory system 110 may include an apparatus capable of transmitting a signal, a piece of data, or others to the host 102 or receiving a signal, a piece of data, or others inputted from the host 102.

The host interface 132 included in the controller 130 may receive a signal, a command (or a request), or a piece of data inputted from the host 102. The host 102 and the memory system 110 may use a predetermined protocol to transmit and receive a piece of data between the host 102 and the memory system 110. An example of protocols or interfaces, supported by the host 102 and the memory system 110 for sending and receiving a piece of data, can include Universal Serial Bus (USB), Multi-Media Card (MMC), Parallel Advanced Technology Attachment (PATA), Small Computer System Interface (SCSI), Enhanced Small Disk Interface (ESDI), Integrated Drive Electronics (IDE), Peripheral Component Interconnect Express (PCIE), Serial-attached SCSI (SAS), Serial Advanced Technology Attachment (SATA), Mobile Industry Processor Interface (MIPI), or others. In an embodiment, the host interface 132 may exchange a piece of data with the host 102 and is implemented with, or driven by, firmware called a host interface layer (HIL).

The Integrated Drive Electronics (IDE) or Advanced Technology Attachment (ATA), used as one of the interfaces for transmitting and receiving a piece of data, can use a cable including 40 wires connected in parallel to support data transmission and reception between the host 102 and the memory system 110. When a plurality of memory systems 110 are connected to a single host 102, the plurality of memory systems 110 may be divided into a master or a slave by using a position or a dip switch to which the plurality of memory systems 110 are connected. The memory system 110 set as the master may be used as the main memory device. The IDE (ATA) has evolved into Fast-ATA, ATAPI, and Enhanced IDE (EIDE).

Serial Advanced Technology Attachment (SATA) is a kind of serial data communication interface that is compatible with various ATA standards of parallel data communication interfaces which is used by Integrated Drive Electronics (IDE) devices. The fourth wires in the IDE interface can be reduced to six wires in the SATA interface. For example, fourth parallel signals for the IDE can be converted into 6 serial signals for the SATA to be transmitted between each other. The SATA has been widely used because of its faster data transmission and reception rate and its less resource consumption in the host 102 used for data transmission and reception. The SATA may support connection with up to 30 external devices to a single transceiver included in the host 102. In addition, the SATA can support hot plugging that allows an external device to be attached or detached from the host 102 even while data communication between the host 102 and another device is being executed. Thus, the memory system 110 can be connected or disconnected as an additional device, like a device supported by a universal serial bus (USB) even when the host 102 is powered on. For example, in the host 102 having an eSATA port, the memory system 110 may be freely detached like an external hard disk.

The Small Computer System Interface (SCSI) is a kind of serial data communication interface used for connection between a computer, a server, and/or another peripheral device. The SCSI can provide a high transmission speed, as compared with other interfaces such as the IDE and the SATA. In the SCSI, the host 102 and at least one peripheral device (e.g., the memory system 110) are connected in series, but data transmission and reception between the host 102 and each peripheral device may be performed through a parallel data communication. In the SCSI, it is easy to connect to, or disconnect from, the host 102 a device such as the memory system 110. The SCSI can support connections of 15 other devices to a single transceiver included in host 102.

The Serial Attached SCSI (SAS) can be understood as a serial data communication version of the SCSI. In the SAS, not only the host 102 and a plurality of peripheral devices are connected in series, but also data transmission and reception between the host 102 and each peripheral device may be performed in a serial data communication scheme. The SAS can support connection between the host 102 and the peripheral device through a serial cable instead of a parallel cable, so as to easily manage equipment using the SAS and enhance or improve operational reliability and communication performance. The SAS may support connections of eight external devices to a single transceiver included in the host 102.

The Non-volatile memory express (NVMe) is a kind of interface based at least on a Peripheral Component Interconnect Express (PCIe) designed to increase performance and design flexibility of the host 102, servers, computing devices, or others equipped with the non-volatile memory system 110. Herein, the PCIe can use a slot or a specific cable for connecting the host 102, such as a computing device, and the memory system 110, such as a peripheral device. For example, the PCIe can use a plurality of pins (for example, 18 pins, 32 pins, 49 pins, 82 pins, etc.) and at least one wire (e.g. x1, x4, x8, x16, etc.), to achieve high speed data communication over several hundred MB per second (e.g. 250 MB/s, 500 MB/s, 984.6250 MB/s, 1969 MB/s, and etc.). In an embodiment, the PCIe scheme may achieve bandwidths of tens to hundreds of Giga bits per second. A system using the NVMe can make the most of an operation speed of the nonvolatile memory system 110, such as an SSD, which operates at a higher speed than a hard disk.

In an embodiment, the host 102 and the memory system 110 may be connected through a universal serial bus (USB). The Universal Serial Bus (USB) is a kind of scalable, hot-pluggable plug-and-play serial interface that can provide cost-effective standard connectivity between the host 102 and a peripheral device such as a keyboard, a mouse, a joystick, a printer, a scanner, a storage device, a modem, a video camera, or others. A plurality of peripheral devices such as the memory system 110 may be coupled to a single transceiver included in the host 102.

Referring to FIG. 2, the error correction circuitry 138 can correct error bits of the data to be processed in (e.g., outputted from) the memory device 150, which may include an error correction code (ECC) encoder and an ECC decoder. Here, the ECC encoder can perform error correction encoding of data to be programmed in the memory device 150 to generate encoded data into which a parity bit is added and store the encoded data in memory device 150. The ECC decoder can detect and correct errors contained in a data read from the memory device 150 when the controller 130 reads the data stored in the memory device 150. In other words, after performing error correction decoding on the data read from the memory device 150, the error correction circuitry 138 can determine whether the error correction decoding has succeeded and output an instruction signal (e.g., a correction success signal or a correction fail signal). The error correction circuitry 138 can use the parity bit which is generated during the ECC encoding process, for correcting the error bit of the read data. When the number of the error bits is greater than or equal to a threshold number of correctable error bits, the error correction circuitry 138 might not correct error bits but instead may output an error correction fail signal indicating failure in correcting the error bits.

In an embodiment, the error correction circuitry 138 may perform an error correction operation based on a coded modulation such as a low density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM), a Block coded modulation (BCM), and so on. The error correction circuitry 138 may include and all circuits, modules, systems or devices for performing the error correction operation based on at least one of the above described codes.

The power management unit (PMU) 140 may control electrical power provided in the controller 130. The PMU 140 may monitor the electrical power supplied to the memory system 110 (e.g., a voltage supplied to the controller 130) and provide the electrical power to components included in the controller 130. The PMU 140 can not only detect power-on or power-off, but also generate a trigger signal to enable the memory system 110 to back up a current state urgently when the electrical power supplied to the memory system 110 is unstable. In an embodiment, the PMU 140 may include a device or a component capable of accumulating electrical power that may be used in an emergency.

The memory interface 142 may serve as an interface for handling commands and data transferred between the controller 130 and the memory device 150, to allow the controller 130 to control the memory device 150 in response to a command or a request inputted from the host 102. The memory interface 142 may generate a control signal for the memory device 150 and may process data inputted to, or outputted from, the memory device 150 under the control of the processor 134 in a case when the memory device 150 is a flash memory. For example, when the memory device 150 includes a NAND flash memory, the memory interface 142 includes a NAND flash controller (NFC). The memory interface 142 can provide an interface for handling commands and data between the controller 130 and the memory device 150. In accordance with an embodiment, the memory interface 142 can be implemented through, or driven by, firmware called a Flash Interface Layer (FIL) as a component for exchanging data with the memory device 150.

In an embodiment, the memory interface 142 may support an open NAND flash interface (ONFi), a toggle mode or the like for data input/output with the memory device 150. For example, the ONFi may use a data path (e.g., a channel, a way, etc.) that includes at least one signal line capable of supporting bi-directional transmission and reception in a unit of 8-bit or 16-bit data. Data communication between the controller 130 and the memory device 150 can be achieved through at least one interface regarding an asynchronous single data rate (SDR), a synchronous double data rate (DDR), and a toggle double data rate (DDR).

The memory 144 may be a sort of working memory in the memory system 110 or the controller 130, while storing temporary or transactional data occurred or delivered for operations in the memory system 110 and the controller 130. For example, the memory 144 may temporarily store a piece of read data outputted from the memory device 150 in response to a request from the host 102, before the piece of read data is outputted to the host 102. In addition, the controller 130 may temporarily store a piece of write data inputted from the host 102 in the memory 144, before programming the piece of write data in the memory device 150. When the controller 130 controls operations such as data read, data write, data program, data erase or etc. of the memory device 150, a piece of data transmitted or generated between the controller 130 and the memory device 150 of the memory system 110 may be stored in the memory 144. In addition to the piece of read data or write data, the memory 144 may store information (e.g., map data, read requests, program requests, etc.) necessary for performing operations for inputting or outputting a piece of data between the host 102 and the memory device 150. In an embodiment, the memory 144 may include a command queue, a program memory, a data memory, a write buffer/cache, a read buffer/cache, a data buffer/cache, a map buffer/cache, or others.

In an embodiment, the memory 144 may be implemented with a volatile memory. For example, the memory 144 may be implemented with a static random access memory (SRAM), a dynamic random access memory (DRAM), or both. Although FIG. 2 illustrates, for example, the memory 144 disposed within the controller 130, the embodiments are not limited thereto. The memory 144 may be located within or external to the controller 130. For instance, the memory 144 may be embodied by an external volatile memory having a memory interface transferring data and/or signals between the memory 144 and the controller 130.

The processor 134 may control the overall operations of the memory system 110. For example, the processor 134 can control a program operation or a read operation of the memory device 150, in response to a write request or a read request entered from the host 102. In an embodiment, the processor 134 may execute firmware to control the program operation or the read operation in the memory system 110. Herein, the firmware may be referred to as a flash translation layer (FTL). An example of the FTL is later described in detail, referring to FIG. 3. In an embodiment, the processor 134 may be implemented with a microprocessor or a central processing unit (CPU).

In an embodiment, the memory system 110 may be implemented with at least one multi-core processor. The multi-core processor is a kind of circuit or chip in which two or more cores, which are considered distinct processing regions, are integrated. For example, when a plurality of cores in the multi-core processor drive or execute a plurality of flash translation layers (FTLs) independently, data input/output speed (or performance) of the memory system 110 may be improved. In an embodiment, the data input/output (I/O) operations in the memory system 110 may be independently performed through different cores in the multi-core processor.

The processor 134 in the controller 130 may perform an operation corresponding to a request or a command inputted from the host 102. Further, the memory system 110 may be independent of a command or a request inputted from an external device such as the host 102. Typically, an operation performed by the controller 130 in response to the request or the command inputted from the host 102 may be considered a foreground operation, while an operation performed by the controller 130 independently (e.g., regardless the request or the command inputted from the host 102) may be considered a background operation. The controller 130 can perform the foreground or background operation for read, write or program, erase or others regarding a piece of data in the memory device 150. In addition, a parameter set operation corresponding to a set parameter command or a set feature command as a set command transmitted from the host 102 may be considered a foreground operation. Meanwhile, as a background operation without a command transmitted from the host 102, the controller 130 can perform garbage collection (GC), wear leveling (WL), bad block management for identifying and processing bad blocks, or the like may be performed, in relation to a plurality of memory blocks 152, 154, 156 included in the memory device 150.

According an embodiment, substantially similar operations may be performed as both the foreground operation and the background operation. For example, if the memory system 110 performs garbage collection in response to a request or a command inputted from the host 102 (e.g., Manual GC), garbage collection can be considered a foreground operation. However, when the memory system 110 may perform garbage collection independently of the host 102 (e.g., Auto GC), garbage collection can be considered a background operation.

When the memory device 150 includes a plurality of dies (or a plurality of chips) including non-volatile memory cells, the controller 130 may be configured to perform a parallel processing regarding plural requests or commands inputted from the host 102 in to improve performance of the memory system 110. For example, the transmitted requests or commands may be divided and processed simultaneously into a plurality of dies or a plurality of chips in the memory device 150. The memory interface 142 in the controller 130 may be connected to a plurality of dies or chips in the memory device 150 through at least one channel and at least one way. When the controller 130 distributes and stores pieces of data in the plurality of dies through each channel or each way in response to requests or commands associated with a plurality of pages including nonvolatile memory cells, plural operations corresponding to the requests or the commands can be performed simultaneously or in parallel. Such a processing method or scheme can be considered as an interleaving method. Because data input/output speed of the memory system 110 operating with the interleaving method may be faster than that without the interleaving method, data I/O performance of the memory system 110 can be improved.

By the way of example but not limitation, the controller 130 can recognize statuses regarding a plurality of channels (or ways) associated with a plurality of memory dies included in the memory device 150. The controller 130 may determine the status of each channel or each way as one of a busy status, a ready status, an active status, an idle status, a normal status and/or an abnormal status. The controller's determination of which channel or way an instruction (and/or a data) is delivered through can be associated with a physical block address, e.g., which die(s) the instruction (and/or the data) is delivered into. The controller 130 can refer to descriptors delivered from the memory device 150. The descriptors can include a block or page of parameters that describe something about the memory device 150, which is data with a predetermined format or structure. For instance, the descriptors may include device descriptors, configuration descriptors, unit descriptors, or others. The controller 130 can refer to, or use, the descriptors to determine which channel(s) or way(s) an instruction or a data is exchanged via.

Referring to FIG. 2, the memory device 150 in the memory system 110 may include the plurality of memory blocks 152, 154, 156. Each of the plurality of memory blocks 152, 154, 156 includes a plurality of nonvolatile memory cells. In an embodiment, the memory block 152, 154, 156 can be a group of nonvolatile memory cells erased together. The memory block 152, 154, 156 may include a plurality of pages which is a group of nonvolatile memory cells read or programmed together. Although not shown in FIG. 2, each memory block 152, 154, 156 may have a three-dimensional stack structure for a high integration. Further, the memory device 150 may include a plurality of dies, each die including a plurality of planes, each plane including the plurality of memory blocks 152, 154, 156. Configuration of the memory device 150 can be different for performance of the memory system 110.

In the memory device 150 shown in FIG. 2, the plurality of memory blocks 152, 154, 156 are included. The plurality of memory blocks 152, 154, 156 can be any of different types of memory blocks such as a single level cell (SLC) memory block, a multi-level cell (MLC) Cell) memory block or the like, according to the number of bits that can be stored or represented in one memory cell. Here, the SLC memory block includes a plurality of pages implemented by memory cells, each storing one bit of data. The SLC memory block can have high data I/O operation performance and high durability. The MLC memory block includes a plurality of pages implemented by memory cells, each storing multi-bit data (e.g., two bits or more). The MLC memory block can have larger storage capacity for the same space compared to the SLC memory block. The MLC memory block can be highly integrated in a view of storage capacity. In an embodiment, the memory device 150 may be implemented with MLC memory blocks such as a double level cell (DLC) memory block, a triple level cell (TLC) memory block, a quadruple level cell (QLC) memory block and a combination thereof. The double level cell (DLC) memory block may include a plurality of pages implemented by memory cells, each capable of storing 2-bit data. The triple level cell (TLC) memory block can include a plurality of pages implemented by memory cells, each capable of storing 3-bit data. The quadruple level cell (QLC) memory block can include a plurality of pages implemented by memory cells, each capable of storing 4-bit data. In another embodiment, the memory device 150 can be implemented with a block including a plurality of pages implemented by memory cells, each capable of storing 5-bit or more bit data.

In an embodiment, the controller 130 may use a multi-level cell (MLC) memory block included in the memory system 150 as a SLC memory block that stores one-bit data in one memory cell. A data input/output speed of the multi-level cell (MLC) memory block can be slower than that of the SLC memory block. That is, when the MLC memory block is used as the SLC memory block, a margin for a read or program operation can be reduced. The controller 130 can utilize a faster data input/output speed of the multi-level cell (MLC) memory block when using the multi-level cell (MLC) memory block as the SLC memory block. For example, the controller 130 can use the MLC memory block as a buffer to temporarily store a piece of data, because the buffer may require a high data input/output speed for improving performance of the memory system 110.

In an embodiment, the controller 130 may program pieces of data in a multi-level cell (MLC) a plurality of times without performing an erase operation on a specific MLC memory block included in the memory system 150. In general, nonvolatile memory cells have a feature that does not support data overwrite. However, the controller 130 may use a feature in which a multi-level cell (MLC) may store multi-bit data, in order to program plural pieces of 1-bit data in the MLC a plurality of times. For MLC overwrite operation, the controller 130 may store the number of program times as separate operation information when a piece of 1-bit data is programmed in a nonvolatile memory cell. In an embodiment, an operation for uniformly levelling threshold voltages of nonvolatile memory cells can be carried out before another piece of data is overwritten in the same nonvolatile memory cells.

In an embodiment of the disclosed technology, the memory device 150 is embodied as a nonvolatile memory such as a flash memory such as a NAND flash memory, a NOR flash memory or others. Alternatively, the memory device 150 may be implemented by at least one of a phase change random access memory (PCRAM), a ferroelectrics random access memory (FRAM), a spin injection magnetic memory (STT-RAM), and a spin transfer torque magnetic random access memory (STT-MRAM), or others.

Figure 3:
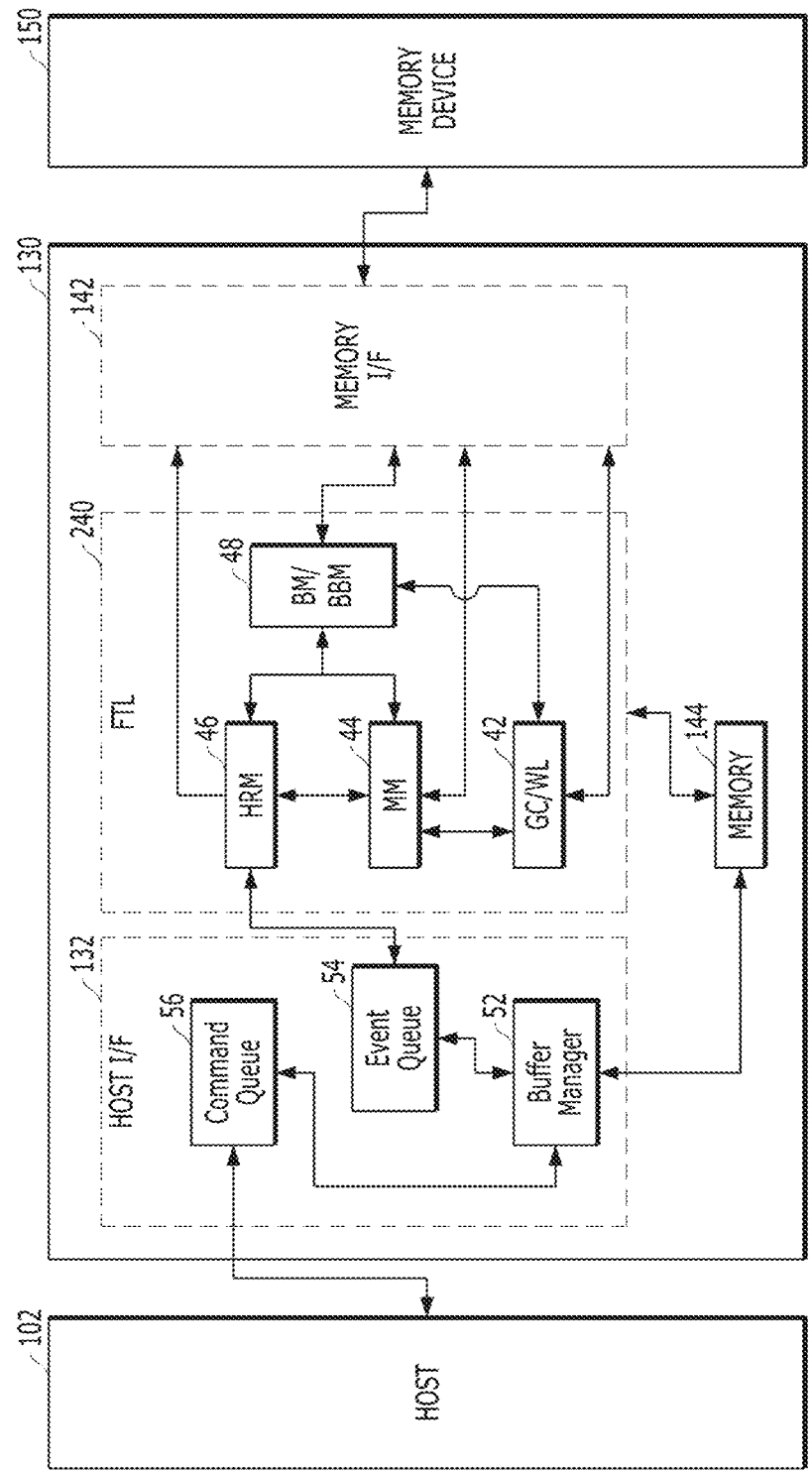
FIG. 3 illustrates a memory system in accordance with another embodiment of the disclosed technology.

Referring to FIG. 3, a controller in a memory system in accordance with another embodiment of the disclosed technology is described. The controller 130 cooperates with the host 102 and the memory device 150. As illustrated, the controller 130 includes a host interface 132, a flash translation layer (FTL) 240, as well as the host interface 132, the memory interface 142 and the memory 144 previously identified in connection with FIG. 2.

Although not shown in FIG. 3, in accordance with an embodiment, the ECC unit 138 described in FIG. 2 may be included in the flash translation layer (FTL) 240. In another embodiment, the ECC unit 138 may be implemented as a separate module, a circuit, firmware or others, which can be included in, or associated with, the controller 130.

The host interface 132 is for handling commands, data, or others that are transmitted from the host 102. By way of example but not limitation, the host interface 132 may include a command queue 56, a buffer manager 52 and an event queue 54. The command queue 56 may sequentially store commands, data, or others received from the host 102 and output them to the buffer manager 52 in an order in which they are stored. The buffer manager 52 may classify, manage or adjust the commands, the data, or others, which are received from the command queue 56. The event queue 54 may sequentially transmit events for processing the commands, the data, or others that are received from the buffer manager 52.

A plurality of commands or data of the same characteristic, e.g., read or write commands, may be transmitted from the host 102, or commands and data of different characteristics may be transmitted to the memory system 110 after being mixed or jumbled by the host 102. For example, a plurality of commands for reading data (read commands) may be delivered, or commands for reading data (read command) and programming/writing data (write command) may be alternately transmitted to the memory system 110. The host interface 132 may store commands, data, or others, which are transmitted from the host 102, to the command queue 56 sequentially. Thereafter, the host interface 132 may estimate or predict what kind of internal operation the controller 130 will perform according to the characteristics of commands, data, or others, which have been entered from the host 102. The host interface 132 can determine a processing order and a priority of commands, data or others, based at least on their characteristics. According to characteristics of commands, data, or others transmitted from the host 102, the buffer manager 52 in the host interface 132 is configured to determine whether the buffer manager should store commands, data, or others in the memory 144, or whether the buffer manager should deliver the commands, the data, or others into the flash translation layer (FTL) 240. The event queue 54 receives events, entered from the buffer manager 52, which are to be internally executed and processed by the memory system 110 or the controller 130 in response to the commands, the data, or others transmitted from the host 102, so as to deliver the events into the flash translation layer (FTL) 240 in the order received.

In accordance with an embodiment, the flash translation layer (FTL) 240 described in FIG. 3 may work as a multi-thread scheme to perform the data input/output (I/O) operations. A multi-thread FTL may be implemented through a multi-core processor using multi-thread included in the controller 130.

In accordance with an embodiment, the flash translation layer (FTL) 240 can include a host request manager (HRM) 46, a map manager (MM) 44, a state manager 42 and a block manager 48. The host request manager (HRM) 46 can manage the events entered from the event queue 54. The map manager (MM) 44 can handle or control a map data. The state manager 42 can perform garbage collection (GC) or wear leveling (WL). The garbage collection may refer to a form of memory management, in which a garbage collector attempts to reclaim (garbage) memory that is occupied by objects that are no longer in use. The wear leveling indicates techniques for prolonging lifetime of erasable storage devices. The block manager 48 can execute commands or instructions onto a block in the memory device 150.

By way of example but not limitation, the host request manager (HRM) 46 can use the map manager (MM) 44 and the block manager 48 to handle or process requests according to the read and program commands, and events which are delivered from the host interface 132. The host request manager (HRM) 46 can send an inquiry request to the map data manager (MM) 44, to determine a physical address corresponding to the logical address which is entered with the events. The host request manager (HRM) 46 can send a read request with the physical address to the memory interface 142, to process the read request (handle the events). The host request manager (HRM) 46 can send a program request (write request) to the block manager 48, to program data to a specific empty page (no data) in the memory device 150, and then, can transmit a map update request corresponding to the program request to the map manager (MM) 44, to update an item relevant to the programmed data in information of mapping the logical-physical addresses to each other.

In some implementations, the block manager 48 can convert a program request delivered from the host request manager (HRM) 46, the map data manager (MM) 44, and/or the state manager 42 into a flash program request used for the memory device 150, to manage flash blocks in the memory device 150. In order to maximize or enhance program or write performance of the memory system 110 (see FIG. 2), the block manager 48 may collect program requests and send flash program requests for multiple-plane and one-shot program operations to the memory interface 142. In an embodiment, the block manager 48 sends several flash program requests to the memory interface 142 to enhance or maximize parallel processing of the multi-channel and multi-directional flash controller.

In some implementations, the block manager 48 can be configured to manage blocks in the memory device 150 according to the number of valid pages, select and erase blocks having no valid pages when a free block is needed, and select a block including the least number of valid pages when it is determined that garbage collection is necessary. The state manager 42 can perform garbage collection to move the valid data to an empty block and erase the blocks containing the moved valid data so that the block manager 48 may have enough free blocks (empty blocks with no data). If the block manager 48 provides information regarding a block to be erased to the state manager 42, the state manager 42 could check all flash pages of the block to be erased to determine whether each page is valid. For example, to determine validity of each page, the state manager 42 can identify a logical address recorded in an out-of-band (OOB) area of each page. To determine whether each page is valid, the state manager 42 can compare the physical address of the page with the physical address mapped to the logical address obtained from the inquiry request. The state manager 42 sends a program request to the block manager 48 for each valid page. A mapping table can be updated through the update of the map manager 44 when the program operation is complete.

The map manager 44 can manage a logical-physical mapping table. The map manager 44 can process requests such as queries, updates, or others, which are generated by the host request manager (HRM) 46 or the state manager 42. The map manager 44 may store the entire mapping table in the memory device 150 (e.g., a flash/non-volatile memory) and cache mapping entries according to the storage capacity of the memory 144. When a map cache miss occurs while processing inquiry or update requests, the map manager 44 may send a read request to the memory interface 142 to load a relevant mapping table stored in the memory device 150. When the number of dirty cache blocks in the map manager 44 exceeds a certain threshold, a program request can be sent to the block manager 48 so that a clean cache block is made and the dirty map table may be stored in the memory device 150.

When garbage collection is performed, the state manager 42 copies valid page(s) into a free block, and the host request manager (HRM) 46 can program the latest version of the data for the same logical address of the page and currently issue an update request. When the status manager 42 requests the map update in a state in which copying of valid page(s) is not completed normally, the map manager 44 might not perform the mapping table update. It is because the map request is issued with old physical information if the status manger 42 requests a map update and a valid page copy is completed later. The map manager 44 may perform a map update operation to ensure accuracy only if the latest map table still points to the old physical address.

Figure 4:
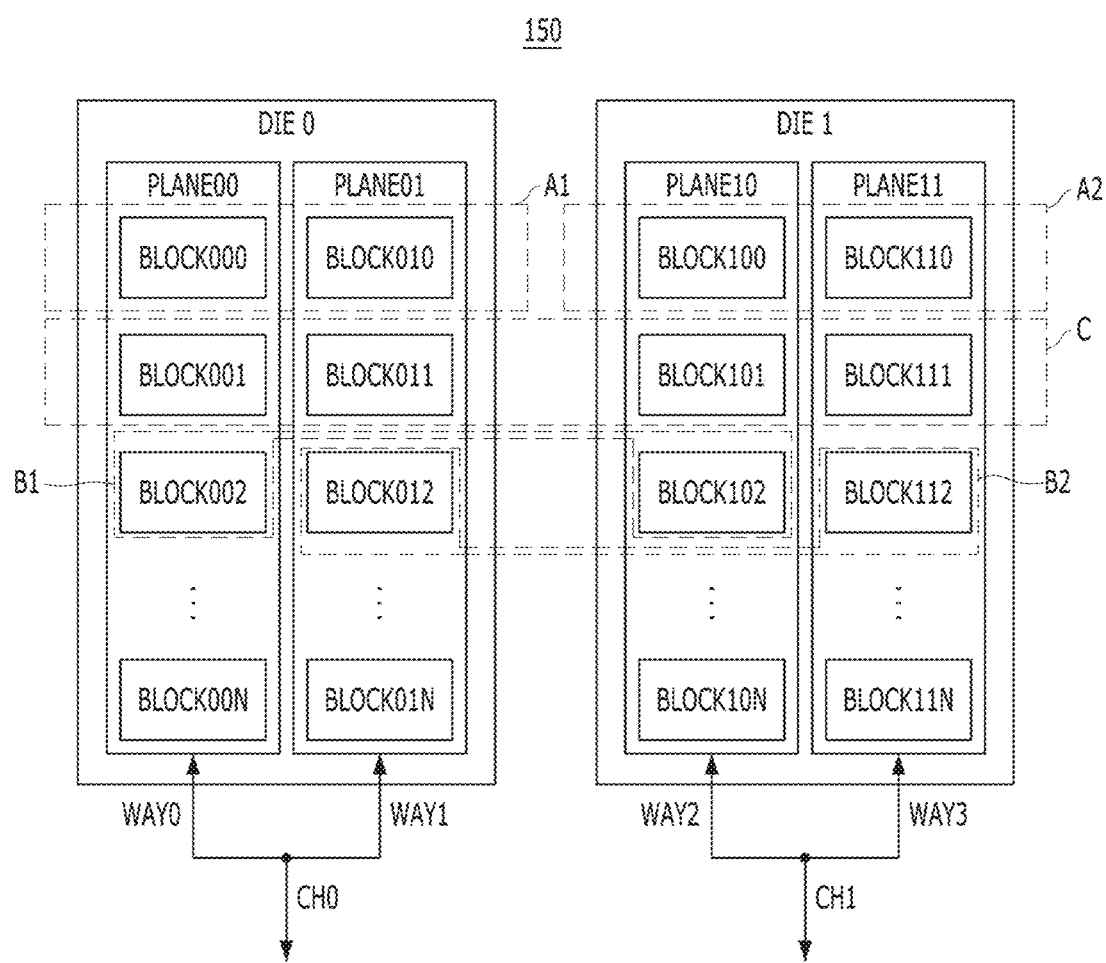
FIG. 4 illustrates a super memory block used in a memory system in accordance with an embodiment of the disclosed technology.

FIG. 4 is a diagram illustrating a super memory block used in a memory system in accordance with an embodiment of the disclosed technology.

Referring to FIG. 4, the memory device 150 may include an arrangement of dies, planes and memory blocks.

The memory device 150 includes a zeroth memory die DIE0 capable of inputting/outputting data through a zeroth channel CH0 and a first memory die DIE1 capable of inputting/outputting data through a first channel CH1. The zeroth channel CH0 and the first channel CH1 may input/output data in an interleaving scheme.

The zeroth memory die DIE0 includes a plurality of planes PLANE00 and PLANE01 respectively corresponding to a plurality of ways WAY0 and WAY1 that are capable of inputting/outputting data in the interleaving scheme by sharing the zeroth channel CH0.

The first memory die DIE1 includes a plurality of planes PLANE10 and PLANE11 respectively corresponding to a plurality of ways WAY2, WAY3 that are capable of inputting/outputting data in the interleaving scheme by sharing the first channel CH1.

The memory device 150 includes a plurality of memory blocks BLOCK0000, BLOCK001, BLOCK002, . . . and BLOCK00N that are included in the first plane of the zeroth memory die, PLANE 00, BLOCK010, BLOCK011, BLOCK012, . . . and BLOCK00N that are included in the second plane of the zeroth memory die, PLANE01, BLOCK100, BLOCK101, BLOCK102, . . . and BLOCK10N that are included in the first plane of the first memory die, PLANE 10, and BLOCK110, BLOCK111, BLOCK112, . . . and BLOCK11N that are included in the second plane of the first memory die, PLANE 11.

In this manner, the plurality of memory blocks in the memory device 150 may be divided according to physical positions such that blocks in the same plane use the same way and blocks in the same die use the same channel.

While it is illustrated in FIG. 4 that the memory device 150 includes two dies, each of which includes two planes, this is merely an example. The number of memory dies in the memory device 150 may be not limited and can be any suitable number based on design and operational considerations. In addition, the number of planes in each memory die may also be varied without being limited to the number in the example shown in FIG. 4. It is to be noted that the set or predetermined number of memory blocks in each plane also may be different depending on design and operational considerations.

Differently from dividing the memory blocks according to physical positions, the controller 130 may use a scheme of dividing the memory blocks into a group if the memory blocks are selected and operated simultaneously. For example, the controller 130 may manage a plurality of memory blocks by grouping memory blocks capable of being selected simultaneously and thereby dividing the plurality of memory blocks into super memory blocks.

There are many various schemes available depending on design considerations as to how the controller 130 groups the plurality of memory blocks into super memory blocks. In the below, three example schemes will be described.

In a first scheme, the memory blocks in different planes in a same die are grouped together in a super memory block. Thus, the controller 130 may create and manage one super memory block A1 in the memory device 150 by grouping one memory block BLOCK000 in the first plane PLANE00 of the zeroth memory die DIE0 and one memory block BLOCK010 in the second plane PLAN E01 of the zeroth memory die DIE0. The controller 130 may also create and manage another super memory block A2 by grouping one memory block BLOCK100 in the first plane PLANE10 and one memory block BLOCK110 in the second plane PLANE11.

In a second scheme, the memory blocks in a same plane in different dies are grouped together in a super memory block. Thus, the controller 130 may create and manage one super memory block B1 to include memory block BLOCK002 in the first plane PLANE00 of the zeroth memory die DIE0 and one memory block BLOCK102 in the first plane PLANE10 of the first memory die DIE1. When applying the second scheme again, the controller 130 may also create and manage another super memory block B2 by grouping one memory block BLOCK012 in the second plane PLAN E01 of the zeroth memory die DIE0 and one memory block BLOCK112 in the second plane PLANE11 of the first memory die DIE1. Thus, while the first scheme groups two memory blocks from two different planes in the same die into a super block, the second scheme groups one block from each of the different dies into a super block. The methodology of either scheme may be extended to apply to arrangements of more than two dies and more than two planes in a die.

In a third scheme, the memory blocks in different planes in different dies are grouped together in a super memory block. Thus, the controller 130 may create and manage one super memory block C by grouping one memory block BLOCK001 in the first plane PLANE00 of the zeroth memory die DIE0, one memory block BLOCK011 in the second plane PLANE01 of the zeroth memory die DIE0, one memory block BLOCK101 in the first plane PLANE10 of the first memory die DIE1, and one memory block BLOCK111 included in the second plane PLANE11 of the first memory die DIE1. Thus, in the third scheme, one block from each plane in each die is grouped to form a super block. The third scheme may also be extended to apply to more complex die/plane arrangements, as is further described below.

Memory blocks that are included in a super memory block can be selected substantially simultaneously through an interleaving scheme, for example, a channel interleaving scheme, a memory die interleaving scheme, a memory chip interleaving scheme or a way interleaving scheme.

Figure 5:
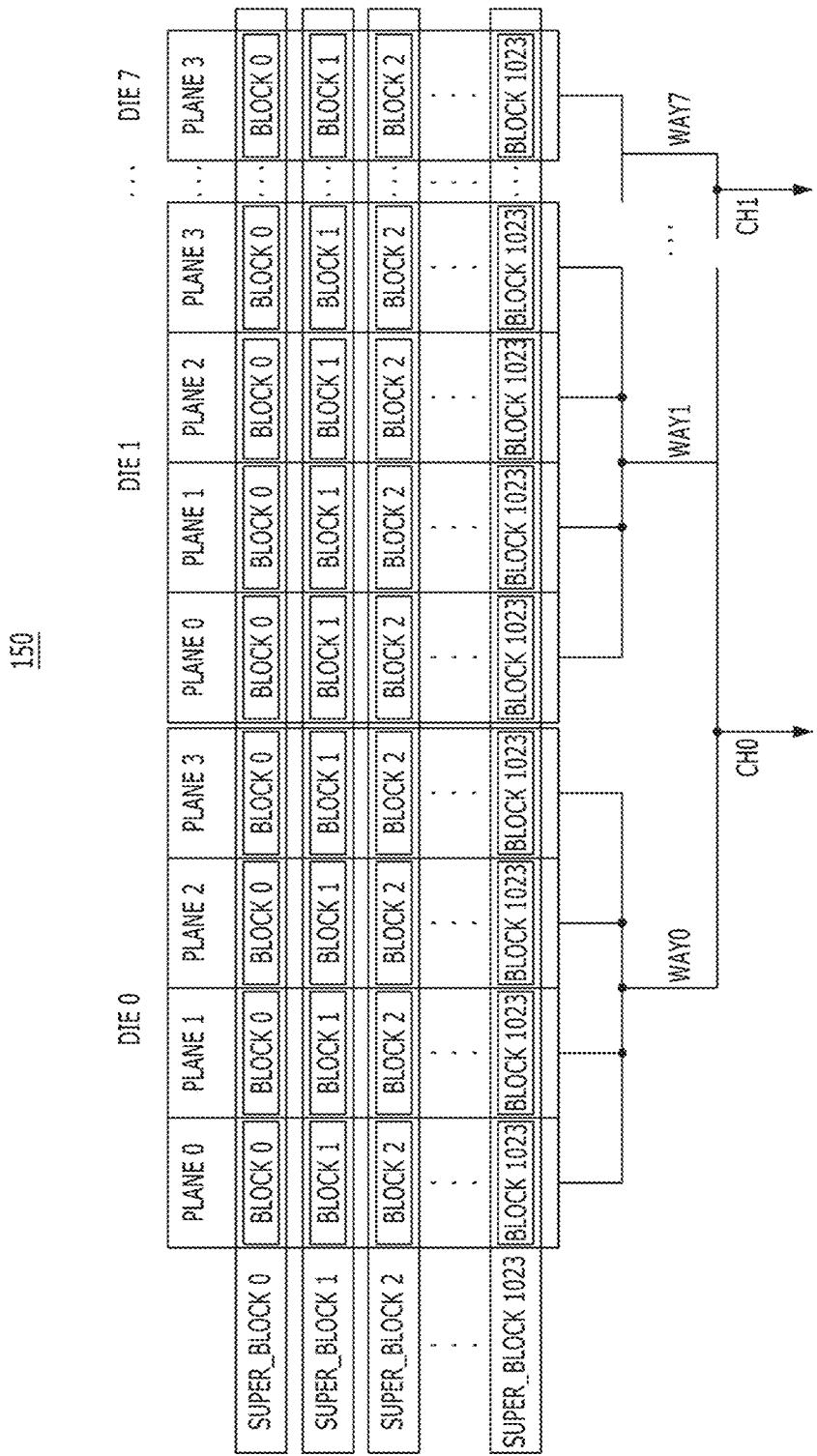
FIG. 5 illustrates an example of super blocks including memory blocks in different planes of different dies in accordance with an embodiment of the disclosed technology.
Figure 6:
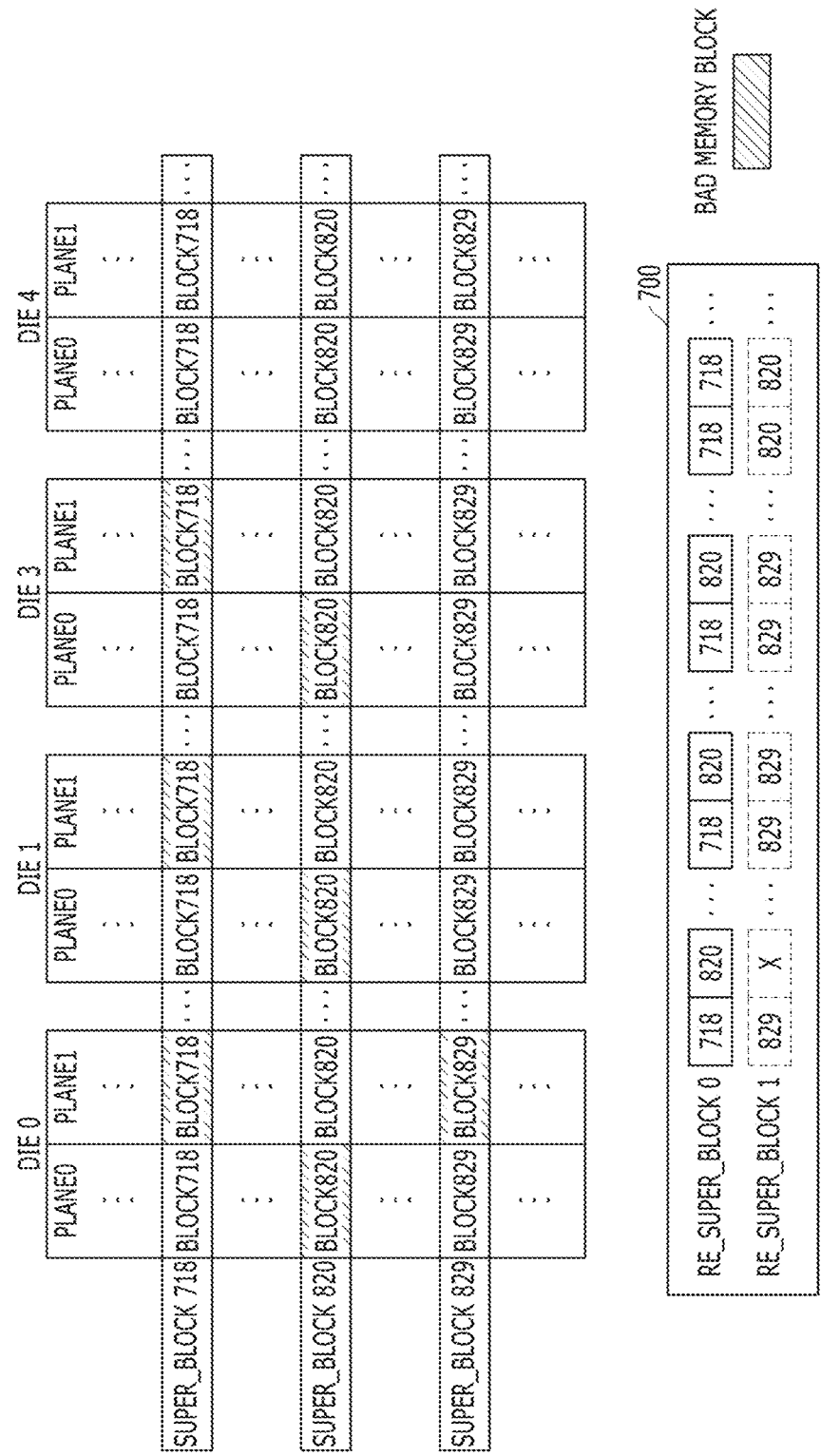
FIG. 6 illustrate an example of regenerating of a super block table based on an implementation of the disclosed technology.

FIGS. 5 and 6 are diagrams illustrating an operation of managing memory blocks by a unit of super memory block in a memory system in accordance with an embodiment of the disclosed technology.

Referring to FIG. 5, the controller 130 may manage the plurality of memory blocks in the memory device 150 using a scheme of forming super memory blocks by dividing the plurality of memory blocks into the super memory blocks.

In FIG. 5, the memory device 150 includes eight memory dies DIE<0:7>. Each of the eight memory dies DIE<0:7> includes four planes PLANE<0:3> to allow the eight memory dies DIE<0:7> to include total 32 planes (i.e., PLANE<0:3>*8). Each of the 32 planes PLANE<0:3>*8 includes 1024 memory blocks BLOCK<0:1023>. Thus, the memory device 150 includes a total of 32768 memory blocks BLOCK<0:1023>*32.

In the memory device 150 illustrated in FIG. 5, the total 32 planes PLANE<0:3>*8 in the eight memory dies DIE<0:7> may input and/or output data through two channels CH<0:1> and eight ways WAY<0:7>. For example, four ways WAY<0:3> or WAY<4:7> share one channel CH0 or CH1. Four planes PLANE<0:3> share one way among WAY0, WAY1, WAY2, WAY3, WAY4, WAY5, WAY6, WAY7.

The controller 130 of the memory system 110 uses a scheme of managing the plurality of memory blocks in the memory device 150 in the unit of a super memory block. As an example, it may be seen that the embodiment shown in FIG. 5 uses the third scheme of dividing memory blocks into super memory blocks by the controller 130 as described above with reference to FIG. 4.

In FIG. 5, the controller 130 forms each of the super memory blocks SUPER_BLOCK<0:1023> by selecting one memory block in each of 32 planes PLANE<0:3>*8 in the memory device 150, and manages the super blocks. Therefore, 32 memory blocks are included in each of the super memory blocks SUPER_BLOCK<0:1023>.

Since the controller 130 selects simultaneously 32 memory blocks in each of the super memory blocks SUPER_BLOCK<0:1023>, in a configuration in which management is performed by the unit of super memory block as in FIG. 5, super memory block addresses (not shown) for selecting the respective super memory blocks SUPER_BLOCK<0:1023> may be used.

In this manner, in order to use the super memory block addresses, the controller 130 uses a scheme of managing super memory blocks by grouping memory blocks of the same relative positions in the respective 32 planes PLANE<0:3>*8 in the memory device 150.

For example, the controller 130 forms and manages a zeroth super memory block SUPER_BLOCK0 by grouping 32 zeroth memory blocks BLOCK0 in the respective 32 planes PLANE<0:3>*8. The controller 130 forms and manages a first super memory block SUPER_BLOCK1 by grouping 32 first memory blocks BLOCK1 in the respective 32 planes PLANE<0:3>*8. The controller 130 forms and manages a second super memory block SUPER_BLOCK2 by grouping 32 second memory blocks BLOCK2 in the respective 32 planes PLANE<0:3>*8. In this manner, the controller 130 manages the 32768 memory blocks BLOCK<0:1023>*32 in the memory device 150 by managing 1024 super memory blocks SUPER_BLOCK<0:1023>, each including 32 memory blocks.

The controller 130 sets an access processing unit to manage super blocks SUPER_BLOCK<0:1023>. Even though the controller 130 selects each of the super memory blocks SUPER_BLOCK<0:1023> by using its super memory block address, each memory block address is still used in the controller 130 to identify a particular memory block included in the particular super memory block identified using the super memory block address. For example, When the controller 130 accesses the zeroth super memory block SUPER_BLOCK0 through a zeroth super memory block address, the controller 130 accesses 32 memory blocks corresponding to 32 zeroth memory blocks BLOCK0 of the respective 32 planes PLANE<0:4>*8 which are grouped into the zeroth super memory block SUPER_BLOCK0.

It is nearly impossible for all the memory blocks in the memory device 150 to operate normally. When mounting and using the memory device 150, there may be at least one bad memory block which does not operate normally among the plurality of memory blocks. Such a memory block, which has poor durability, may be determined as a bad memory block because it does not perform a normal operation even when its lifetime limit is not reached.

As described above, in the case where the controller 130 uses the scheme of managing super memory blocks by grouping memory blocks of the same relative positions or locations in the respective 32 planes PLANE<0:3>*8 into a same super memory bock, if a bad memory block is included in the super memory block, the super memory block cannot operate normally and thus it is not allowed to set an access processing unit to that super memory block.

For example, even though only one memory block is a bad memory block and all the remaining 31 memory blocks still operate normally, if the access processing unit of the corresponding super memory block cannot be set, it is very inefficient.

In consideration of this fact, a super memory block where at least one memory block included therein is a bad memory block is reused by employing a regenerated super block table 700 as shown in FIG. 6.

Referring to FIG. 6, three super blocks, SUPER_BLOCK718, SUPER_BLOCK820, SUPER_BLOCK829 are shown. It is assumed that one or more memory blocks among the 32 memory blocks in each of the 718th super memory block SUPER_BLOCK718, the 820th super memory block SUPER_BLOCK820 and the 829th super memory block SUPER_BLOCK829 are determined as bad memory blocks.

For example, among the 32 memory blocks included in the 718th super memory block SUPER_BLOCK718, the memory blocks in the first planes PLANE1 of the zeroth, first, third memory dies DIE0, DIE1, DIE3 are determined as a bad memory block and the remaining 29 memory blocks are good memory blocks.

Among the 32 memory blocks included in the 820th super memory block SUPER_BLOCK820, the memory blocks in the zeroth planes PLANE) of the zeroth, first, third memory dies DIE0, DIE1, DIE3 are determined as bad memory blocks and the remaining 29 memory blocks are good memory blocks.

Among the 32 memory blocks included in the 829th super memory block SUPER_BLOCK829, the memory block in the first plane PLANE1 of the zeroth memory die DIE0 is determined as a bad memory block and the remaining 31 memory blocks are good memory blocks.

In this state, the controller 130 generates the regenerated super block table 700 for replacing the bad memory blocks in the respective 718th super memory block SUPER_BLOCK718, 820th super memory block SUPER_BLOCK820 and 829th super memory block SUPER_BLOCK829 with good memory blocks, thereby regenerating super memory blocks for their normal operations.

For example, in order to reuse the 718th super memory block SUPER_BLOCK718, the controller 130 needs to search for a memory block to be used to replace the bad memory block in the first plane PLANE1 of the first memory die DIE1.

In an embodiment, the controller 130 searches for a super memory block in which at least one bad memory block is included, among the super memory blocks SUPER_BLOCK<0:1023>. The controller 130 may exclude any super memory block having only good memory blocks from the search.

In some implementations, as the result of the search, the controller 130 may find the 820th super memory block SUPER_BLOCK820 which includes two bad memory blocks. For the 820th super memory block SUPER_BLOCK820, the controller 130 checks whether the position or location of any of the bad memory blocks in the 820th super memory block SUPER_BLOCK820 is same as that of the bad memory block in the 718th super memory block SUPER_BLOCK718.

If the location of any of the bad memory blocks in the 820th super memory block SUPER_BLOCK820 is same as that of the bad memory block in the 718th super memory block SUPER_BLOCK718, the 820th super memory block SUPER_BLOCK820 is excluded from the candidate super memory block to be used to regenerate the super block SUPER_BLOCK718, and a search is resumed to find another super memory block. If the location of any of the bad memory blocks in the 820th super memory block SUPER_BLOCK820 is different from that of the bad memory block in the 718th super memory block SUPER_BLOCK718, the 820th super memory block SUPER_BLOCK820 is determined as the candidate super memory block used to regenerate the super block SUPER_BLOCK718.

As can be seen from FIG. 6, the bad memory block of the 718th super memory block SUPER_BLOCK718 is located in the first plane PLANE1 of the first memory die DIE1, and the bad memory blocks of the 820th super memory block SUPER_BLOCK820 are located in the first plane PLANE1 of the third memory die DIE3 and the first plane PLANE1 of the fourth memory die DIE4. Thus, the locations of the bad memory blocks in the 820th super memory block SUPER_BLOCK820 do not overlap with any of the locations of the bad memory blocks in the 718th super memory block SUPER_BLOCK718.

Therefore, the controller 130 determines the 820th super memory block SUPER_BLOCK820 as the candidate super memory block, and generates the regenerated super block table 700 as shown in FIG. 7B such that the memory block in the first plane PLANE1 of the first memory die DIE1, among the 32 memory blocks in the 820th super memory block SUPER_BLOCK820, may be used for the 718th super memory block SUPER_BLOCK718.

In order to replace the 718th super memory block SUPER_BLOCK718, the controller 130 sets the first row of the regenerated super block table 700 as a zeroth regenerated super memory block RE_SUPER_BLOCK0, and stores the block address values of 32 memory blocks for replacing the 718th super memory block SUPER_BLOCK718.

Thus, in the values of the zeroth regenerated super memory block RE_SUPER_BLOCK0 stored in the first row of the regenerated super block table 700, only three block address for indicating the memory block in the first plane PLANE1 of the first memory die DIE1 is the block address of the 820th super memory block SUPER_BLOCK820, and all the remaining 29 block addresses are the block addresses of the 718th super memory block SUPER_BLOCK718.

In this way, because the regenerated super block table 700 is generated, when the controller 130 accesses the 718th super memory block SUPER_BLOCK718, reference may be made to the values of the zeroth regenerated super memory block RE_SUPER_BLOCK0 stored in the first row of the regenerated super block table 700.

In order to reuse the 820th super memory block SUPER_BLOCK820, the controller 130 needs to search for memory blocks capable of replacing the memory blocks in the first planes PLANE1 of the zeroth, first, third memory dies DIE0, DIE1, DIE3, the bad memory blocks in the zeroth planes PLANE) of the zeroth, first, third memory dies DIE0, DIE1, DIE3 among the 32 memory blocks included in the 820th super memory block SUPER_BLOCK820 with another memory blocks.

Even though there are only three bad memory blocks among the 32 memory blocks in the 820th super memory block SUPER_BLOCK820, a search may be conducted for memory blocks capable of replacing six memory blocks among the 32 memory blocks included in the 820th super memory block SUPER_BLOCK820. It is because three memory blocks among the 32 memory blocks included in the 820th super memory block SUPER_BLOCK820 is used to cover three bad block in the 718th super memory block SUPER_BLOCK718, so as to normally operate the 718th super memory block SUPER_BLOCK718. Namely, the reason is that the regenerated super block table 700 is generated to use the memory block in the first plane PLANE1 of the first memory die DIE1 among the 32 memory blocks included in the 820th super memory block SUPER_BLOCK820.

Hence, in order to reuse the 820th super memory block SUPER_BLOCK820, the controller 130 searches for a super memory block in which at least one bad memory block is included, among the super memory blocks SUPER_BLOCK<0:1023>. The controller 130 may exclude any super memory block including only good memory blocks from the search.

In some implementations, as the result of the search, the controller 130 may find the 829th super memory block SUPER_BLOCK829 which includes one bad memory block. For the 829th super memory block SUPER_BLOCK829, the controller 130 checks whether the location of the bad memory block in the 829th super memory block SUPER_BLOCK829 is same as the location of any of the bad memory blocks in the 718th super memory block SUPER_BLOCK718 and the location of any of the bad memory blocks in the 820th super memory block SUPER_BLOCK820.

If blocks in the same location exists, i.e., if the location of the bad memory block in the 829th super memory block SUPER_BLOCK829 is same as the location of any bad memory blocks in the 718th super memory block SUPER_BLOCK718 and the location of any bad memory blocks included in the 820th super memory block SUPER_BLOCK820, the 829th super memory block SUPER_BLOCK829 is excluded from the candidate super memory block to be used to regenerate the super block SUPER_BLOCK820, and a search is resumed to find another super memory block. If there is no location overlap, the 829th super memory block SUPER_BLOCK829 is determined as the candidate super memory block used to regenerate the super block SUPER_BLOCK820.

In FIG. 6, the bad memory block of the 829th super memory block SUPER_BLOCK829 is located in the first plane PLANE1 of the zeroth memory die DIE0, and one of the bad memory blocks in the 718th super memory block SUPER_BLOCK718 is located in the first plane PLANE1 of the first memory die DIE1. Thus, the location of the memory block of the first plane PLANE1 in the zeroth die DIE0 of the 820th super memory block SUPER_BLOCK820 may not be replaced with the memory block located at the same position in the 829th super memory block SUPER_BLOCK829.

Therefore, the controller 130 determines the 829th super memory block SUPER_BLOCK829 as a search target, and generates the regenerated super block table 700 such that the memory block in the first plane PLANE1 of the first memory die DIE1, the memory block in the first plane PLANE1 of the third memory DIE3 and the memory block in the first plane PLANE1 of the fourth memory die DIE4 of the 829th super memory block SUPER_BLOCK829 may be used for the 820th super memory block SUPER_BLOCK820.

In order to replace the 820th super memory block SUPER_BLOCK820, the controller 130 sets the second row of the regenerated super block table 700 as a first regenerated super memory block RE_SUPER_BLOCK1, and stores the respective block address values of 32 memory blocks for replacing the 820th super memory block SUPER_BLOCK820.

Thus, among the values of the first regenerated super memory block RE_SUPER_BLOCK1 stored in the second row of the regenerated super block table 700, only three are block addresses for blocks in the super memory block SUPER_BLOCK829: one indicating the memory block in the first plane PLANE1 of the first memory die DIE1, another indicating the memory block in the first plane PLANE1 of the third memory die DIE3 and the third indicating the memory block in the first plane PLANE1 of the fourth memory die DIE4. All the remaining 29 block addresses are for memory blocks of the 820th super memory block SUPER_BLOCK820.

In this way, because the regenerated super block table 700 is generated, when the controller 130 accesses the 820th super memory block SUPER_BLOCK820, reference may be made to the values of the first regenerated super memory block RE_SUPER_BLOCK1 stored in the second row of the regenerated super block table 700.

Then, in order to reuse the 829th super memory block SUPER_BLOCK829, the controller 130 needs to search for memory blocks capable of replacing the bad memory block in the first plane PLANE1 of the zeroth memory die DIE0, the memory block in the first plane PLANE1 of the first memory die DIE1, the memory block in the first plane PLANE1 of the third memory die DIE3 and the memory block in the first plane PLANE1 of the fourth memory die DIE4, among the 32 memory blocks included in the 829th super memory block SUPER_BLOCK829.

Even though only one bad memory block is in the 829th super memory block SUPER_BLOCK829, memory blocks capable of replacing four memory blocks among the 32 memory blocks in the 829th super memory block SUPER_BLOCK829 are searched. The reason why the memory blocks capable of replacing four memory blocks among the 32 memory blocks in the 829th super memory block SUPER_BLOCK829 are searched is that three good memory blocks of the 829th super memory block SUPER_BLOCK829 are used to normally operate the 820th super memory block SUPER_BLOCK820 as a regenerated super memory block. Namely, the reason is that the regenerated super block table 700 is generated to use the memory blocks in the first plane PLANE1 of the first memory die DIE1, the first plane PLANE1 of the third memory die DIE3 and the first plane PLANE1 of the fourth memory die DIE4, among the 32 memory blocks included in the 829th super memory block SUPER_BLOCK829.

Hence, in order to reuse the 829th super memory block SUPER_BLOCK829, the controller 130 searches for a super memory block in which at least one bad memory block is included, among the super memory blocks SUPER_BLOCK<0:1023>. The controller 130 may exclude, as a search target, any super memory block among the super memory blocks SUPER_BLOCK<0:1023>, in which only good memory blocks are included.

As a result of the search, the controller 130 may not search a super memory block which includes a bad memory block.

Accordingly, the controller 130 does not reuse the 829th super memory block SUPER_BLOCK829.

By using the regenerated super block table 700 as described above with reference to FIG. 6, even though bad memory blocks are included in the three super memory blocks SUPER_BLOCK718, SUPER_BLOCK820, SUPER_BLOCK829, it is possible to set an access processing unit to super memory block unit for the two super memory blocks SUPER_BLOCK718, SUPER_BLOCK820.

In the scheme as shown in FIG. 6, some super memory blocks, i.e., SUPER_BLOCK718, SUPER_BLOCK820, among the super memory blocks SUPER_BLOCK718, SUPER_BLOCK820, SUPER_BLOCK829 including bad memory blocks, are normally used, and only the super memory block SUPER_BLOCK829 is not used.

However, even in the scheme as shown in FIG. 6, the super memory block SUPER_BLOCK829, although incapable of being used, still exists, and the good memory blocks in the super memory block SUPER_BLOCK829 cannot be used because they are not grouped by a super memory block unit.

Figure 7:
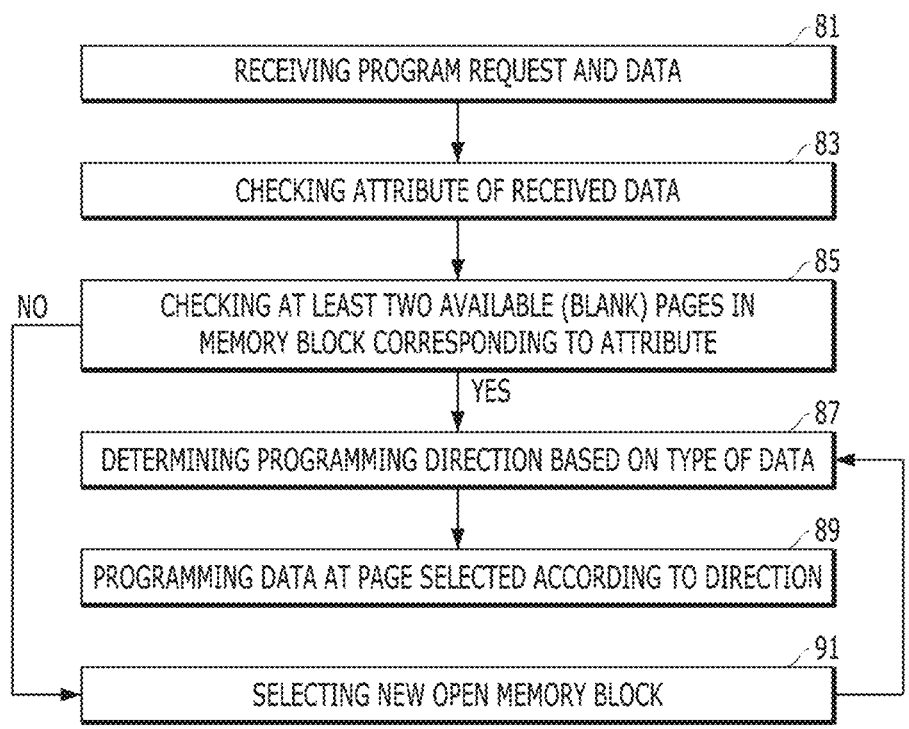
FIG. 7 describes a method for performing a write operation in a memory system according to an embodiment of the disclosed technology.

FIG. 7 describes a method for performing a write operation in a memory system based on an embodiment of the disclosed technology.

Referring to FIG. 7, a write operation performed in the memory system may include receiving a program request and data (step 81) and checking an attribute of the received data (step 83). Referring to FIGS. 2 and 3, the memory system 110 may receive the program request (or a write command) inputted along with a logical address and a piece of write data from the host 102.

In an embodiment, the memory system 110 may use various ways to check the attribute of the write data. For example, the memory system 110 may receive an attribute of write data when the host 102 transfer the write data with its attribute. When the host 102 determines an attribute of the write data, the host 102 may transfer the attribute associated with the write data into the memory system 110. In this case, the memory system 110 may recognize the attribute of the write data based on information transferred from the host 102.

In an embodiment, the host 102 might not determine or recognize an attribute of the data programmed in the memory system 110. In this case, the memory system 110 can monitor an access frequency, an update cycle, or others of data stored in the memory device 150 during a preset period or a period determined by events. The memory system 110 can determine an attribute of the data based at least on a monitoring result. The memory system 110 may associate a determined attribute of the data with a logical address corresponding to the data. Thereafter, when the write data and the logical address corresponding to the write data are inputted from the host 102, the memory system 110 may recognize an attribute of the write data based on the determined attribute associated with the logical address.

When the memory system 110 checks the attribute of the write data, the memory system 110 may determine to which memory block the write data is programmed (step 85). Referring to FIGS. 1 to 3, the memory device 150 may include plural memory blocks each allocated for storing data of different attributes. For example, a memory block may be arranged to store data of a specific attribute, and data of another attribute may be stored in another memory block. In an embodiment, plural memory blocks corresponding to different attributes may be included in each memory die or each plane of the memory device 150. In an embodiment, the FTL 240 shown in FIG. 3 can determine which attribute's data is stored in which memory block.

After determining which memory block the write data is programmed based on its attribute, the memory system 110 may check whether there are two or more programmable (blank) pages in the determined memory block (step 85). A write operation with a single stream may be performed at a single blank page in an open memory block. However, when the memory block can support two streams, a write operation with two streams may require at least two pages in the memory block because two different pieces of data could be programmed in different locations within the memory block. The memory system can check how many blank pages are in the memory block and compare the number of blank pages with the number of streams, before performing a program operation with multi streams.

When there is one or less blank page in the memory block (NO in step 85), the memory system 110 may select a new open memory block (step 91). The new open memory block may be selected from free blocks in the memory device 150. If there is no free block in the memory device 150, the memory system 110 may perform garbage collection to generate a free block.

When at least two blank pages are in the memory block (YES in step 85), the memory system may determine a program direction in the memory block (e.g., select a stream) according to a type of data to be programmed (step 87). For example, when a piece of write data is a kind of user data, the memory system 110 may select a first stream to program the piece of write data in the memory block. When the piece of write data is a kind of meta data, the memory system 110 may select a second stream in the memory block. Thus, when the memory system may program both user data and meta data corresponding to the user data in the same memory block, the memory system may select a different stream based on a type of the data.

Thereafter, the memory system 110 may program a piece of data at a page determined according to a program direction (step 89). The memory device 150 may sequentially program plural pieces of data in the memory block, based on a stream. For example, after a piece of user data is programmed at a blank page in the memory block through the second stream STREAM #2, a piece of meta data associated with the piece of user data programmed via the second stream STREAM #2 in the memory block may be programmed at another blank page through the first stream STREAM #1.

In a scheme for storing user data in a memory block arranged based on an attribute of user data and sequentially programming plural pieces of user data and plural pieces of meta data, each corresponding to each pieces of user data, via different streams (e.g., according to different directions in the memory block), it is possible to avoid the increase on the number of open memory blocks in the memory device 150. For example, the number of open memory block may be increased in proportional to the number of attributes of user data. However, the number of open memory block might not be increased based on a type of data programmed in the memory device, or the number of open memory blocks may be decreased in proportional to the number of streams supported by the memory block of the memory device. Through this scheme, a program operation performed within the memory system 110 can be controlled more concisely and efficiently while avoiding the increase on the number of open memory blocks.

Figure 8:
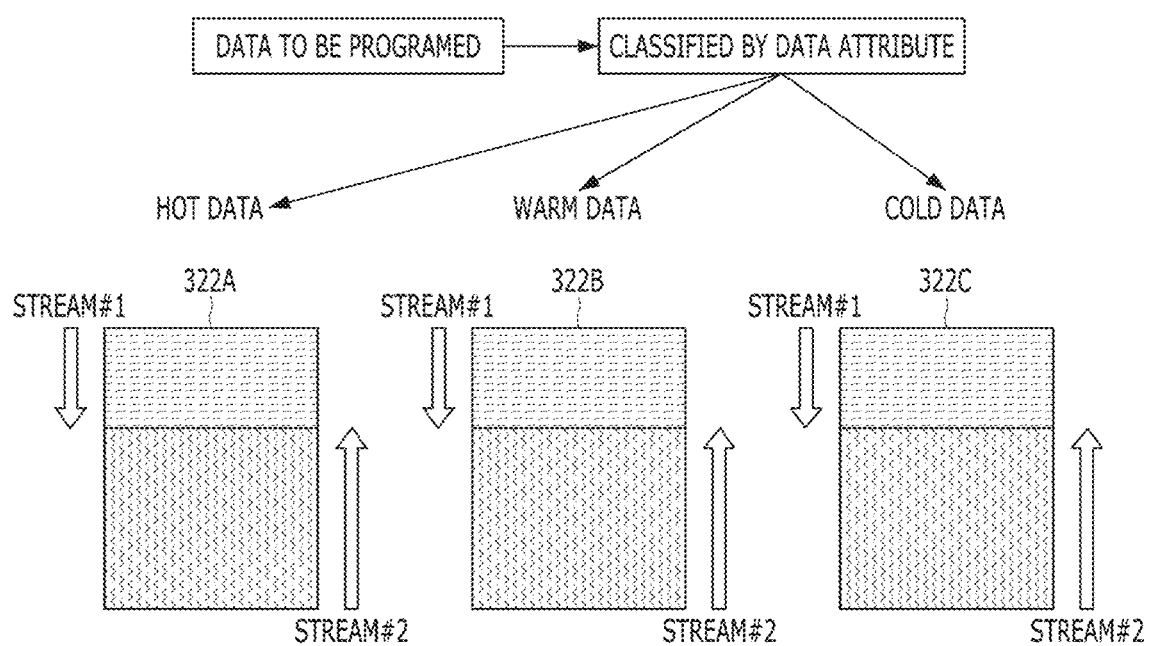
FIG. 8 illustrates plural memory blocks in a memory system when a write operation is performed based on an implementation of the disclosed technology.

FIG. 8 illustrates plural memory blocks in a memory system when a write operation is performed based on some implementations of the disclosed technology.

Referring to FIG. 8, plural pieces of data, each having different attributes, may be individually programmed into each of plural memory blocks 322A, 322B, 322C in the memory device 150, through the write operation shown in FIG. 7. It may be assumed that a first memory block 322A of the plural memory blocks 322A, 322B, 322C in the memory device 150 is allotted to store hot data (i.e., user data having an attribute of hot), a second memory block 322B is allotted to store warm data which has an attribute of warm, and a third memory block 322C is allotted to store cold data which has an attribute of cold. Herein, an attribute of hot, warm or cold may be determined based on a frequency of assessing a piece of data.

When user data is transferred from the host 102, the memory system 110 may classify the user data according to its attribute. After the user data is classified according to its attribute, the user data may be programmed into a memory block allocated for the corresponding attribute.

In this case, the memory system may program the user data inputted from the host 102 as well as meta data corresponding to the user data in the plural memory blocks 322A, 322B, 322C. The meta data may be generated within the memory system 110. As shown in FIGS. 1 and 7, the user data and the meta data, which are different types of write data, can be stored in the same memory block. However, the user data and the meta data may be programmed in the memory block through different streams STREAM #1, STREAM #2.

Referring to FIGS. 7 to 8, during a program operation for storing data inputted from the host 102 to a memory block of the memory device 150 is performed, both the user data and the meta data, which are different types of data, can be stored in the same memory block. As shown in FIG. 7, when two or more blank pages are not included in the memory block, the memory system 110 may open a new memory block (i.e., select a new open memory block among free blocks) and, then, perform a data program operation in the new memory block in the same manner. Thus, the new memory block may include user data and meta data corresponding to the user data, which is distinguished from each other, through different streams STREAM #1, STREAM #2.

Although not shown, because user data and metadata corresponding to the user data, which are different types of data, are stored in a single memory block, a direction for a read operation may be determined or selected according to the stream when the memory system accesses or read any data stored in the memory block. For example, a random read operation may access a page in a memory block and read data stored at the page. However, in order to sequentially plural pieces of data, the memory system 110 may access a plurality of pages storing the plural pieces of data in the memory block. The memory system 110 may sequentially access plural pages in different directions or a single direction. For example, the memory system 110 may sequentially read data from plural pages based on the first stream STREAM #1 where plural pieces of data are sequentially programmed in a first direction from the first page PAGE1 to the last page PAGE(m) in the memory block. In addition, the memory system 110 may sequentially read plural pieces of data via the second stream STREAM #2 where plural pieces of data are sequentially programmed in the second direction from the last page PAGE(m) to the first page PAGE1 in the memory block. Multi-stream for a data program operation may be applicable to a data read operation.

Figure 9:
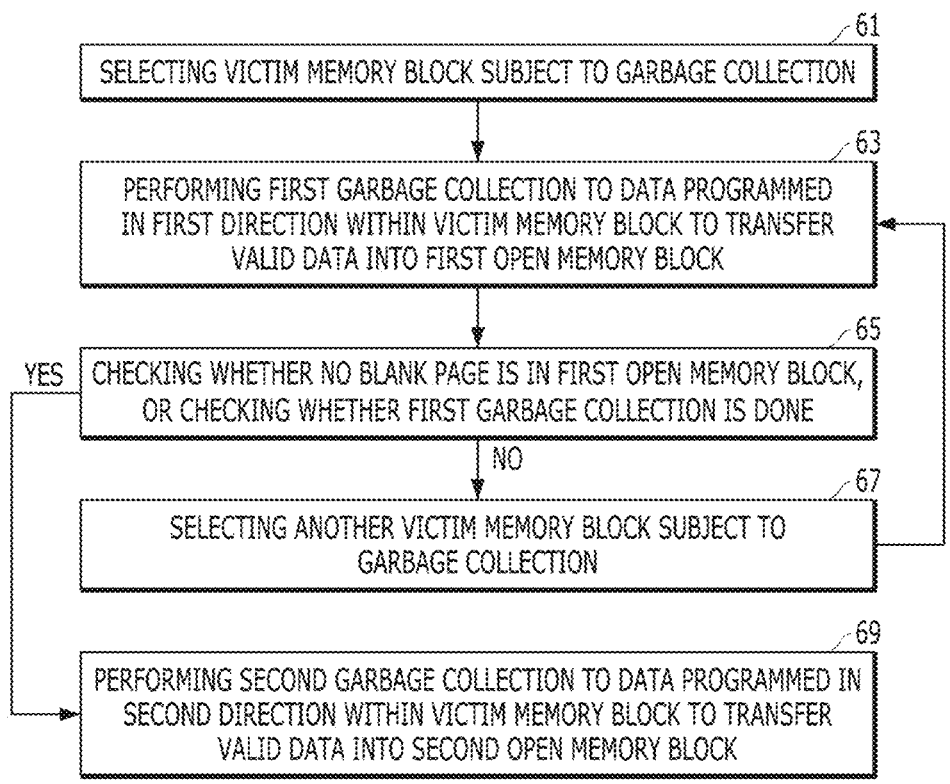
FIG. 9 illustrates a method for performing garbage collection in a memory system according to an embodiment of the disclosed technology.

FIG. 9 illustrates a method for performing a garbage collection in a memory system based on an embodiment of the disclosed technology.

Referring to FIG. 9, the garbage collection performed with the memory system includes selecting a victim memory block, which is subject to the garbage collection, among plural memory blocks (step 61), and performing first garbage collection to data programmed in a first direction with the selected victim memory block to transfer valid data into a first open memory block (step 63).

For the first garbage collection, the memory system may select the victim memory block from closed memory blocks among a plurality of memory blocks included in the memory device 150. The closed memory block may correspond to the memory block including no blank page so that any piece of data may be no longer programmed without an erase operation. In an embodiment, how to select a victim memory for garbage collection may be varied. For example, a victim memory block may be selected, based on a valid page count (VPC), among closed memory blocks. As the number of valid pages in a closed memory block is lower, the closed memory block may be selected first as the victim memory block.

Referring to FIG. 8, the victim memory block selected for the first garbage collection may include first data programmed in a first direction and second data programmed in a second direction. In an embodiment, the first direction and the second direction might be opposite to each other. For example, the first data programmed in the first direction within the victim memory block may include user data while the second data programmed in the second direction within the victim memory block may include meta data corresponding to the user data.

After transferring valid data stored in the first direction from the victim memory block selected for the first garbage collection into the first open memory block, the memory system may check whether there is no blank page in the first open memory block or check whether the first garbage collection is done (step 65). When every valid data of the victim memory block has been transferred and there is no blank page in the first open memory block, the first garbage collection to data programmed in the first direction within the victim memory block may be stopped. However, when there is a blank page in the first open block after every valid data of the victim memory block has been transferred (NO in step 65), the memory system may select another victim memory block to keep the first garbage collection going (step 67). In an embodiment, both the victim memory block and the next victim memory block for the first garbage collection may be allotted for storing data of the same attribute. That is, the garbage collection may be performed separately based on an attribute of data. For example, when the first garbage collection is performed to a victim memory block assigned for hot data, a next victim memory block may be selected, based on a valid page count, among the closed memory blocks assigned for hot data.

The newly selected victim memory block may also store first data programmed in the first direction and second data programmed in the second direction opposite to the first direction. Because the first garbage collection has been performed to data programmed in the first direction of the victim memory block, the memory system may perform the first data programmed in the first direction in the newly selected victim memory block (step 63).

When every valid data of the victim memory block has been transferred and there is no blank page in the first open memory block after the first garbage collection (YES in the step 65), the memory system may perform second garbage collection to data programmed in the second direction within the victim memory block to transfer valid data into a second open memory block (step 69).

After the first garbage collection is performed on valid data programmed in the first direction, the second garbage collection may be performed on valid data programmed in the second direction within the victim memory block to which the first garbage collection has been performed. In an embodiment, garbage collection may be performed separately and consecutively based on streams of the victim memory block, so that operation efficiency of the garbage collection can be improved.

In an embodiment, data programmed in the first direction may be user data, while data programmed in the second direction may be meta data corresponding to the user data. In another embodiment, the data programmed in the second direction may be user data, while the data programmed in the first direction may be meta data corresponding to the user data.

Figure 10:
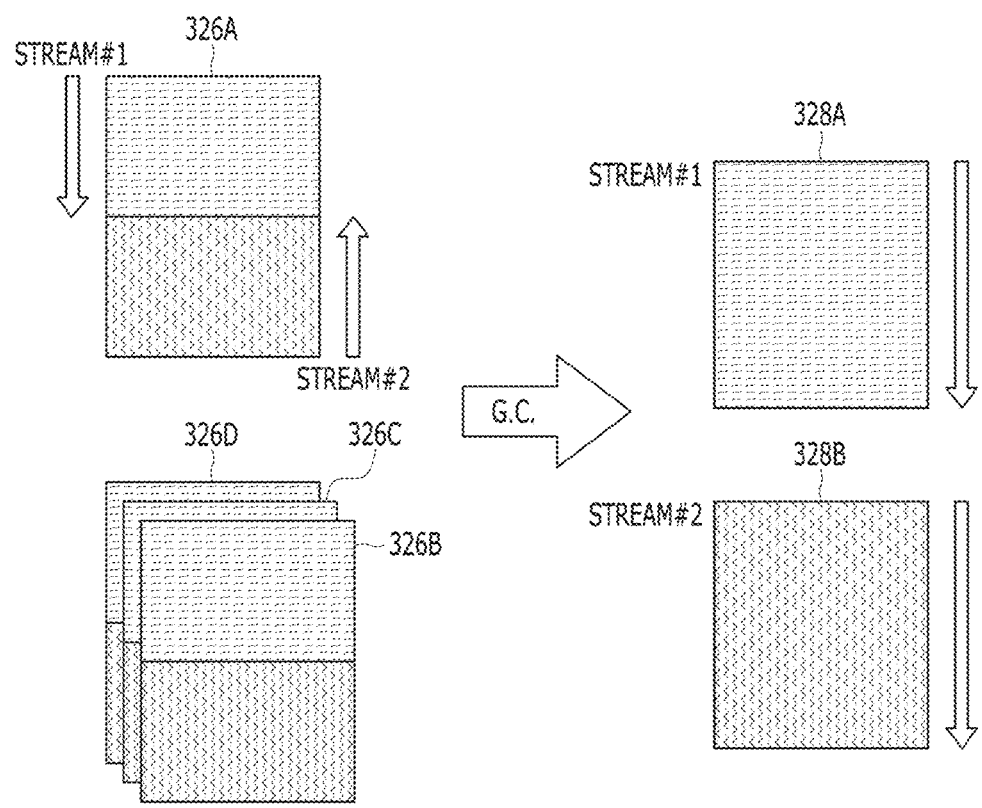
FIG. 10 shows plural memory blocks in a memory system after a garbage collection is performed based on an implementation of the disclosed technology.

FIG. 10 shows plural memory blocks in a memory system after a garbage collection is performed based on some implementations of the disclosed technology.

Referring to FIG. 10, the garbage collection shown in FIG. 9 may change data configuration stored in a memory block. For example, before the garbage collection, each of the plurality of closed memory blocks 326A, 326B, 326C, 326D, which may be selected as a victim memory block in the memory device, may include different types of data programmed through different streams STREAM #1, STREAM #2. User data and meta data corresponding to the user data may be programmed in the same memory block.

When the garbage collection is performed on the plurality of memory blocks 326A, 326B, 326C, 326D in the memory device, the garbage collection may be performed individually or separately depending on a type of data stored in the plurality of memory blocks 326A, 326B, 326C, 326D through different streams STREAM #1, STREAM #2. Accordingly, user data and metadata corresponding to the user data, which are different types of data, may be individually transferred to different open memory blocks 328A, 328B. After the garbage collection is performed, each of the memory blocks 328A, 328B may store one type of data, not different types of data. Thus, the memory blocks 328A, 328B do not have to support multi-stream because only one type of data may be programmed therein. For example, the memory block 328A includes user data only, while the memory block 328B includes meta data corresponding to the user data only.

In an embodiment of the disclosed technology, in a data program operation for storing a piece of data inputted from the host, a piece of data may be stored in a different memory block based on its attribute. A memory block may include one attribute of data but plural types of data after the data program operation. The garbage collection may be individually performed to the memory block based on an attribute of data as well as a type of data (or streams). Accordingly, after the garbage collection is performed, a memory block may store plural pieces of data which have the same attribute and the same type.

For example, the garbage collection according to an embodiment of the disclosed technology may be performed to a memory block that is used for storing data in the memory device 150 temporarily rather than permanently. When the memory system 110 is designed to perform a large amount of data faster, the memory system may include a non-volatile memory structure such as an SLC buffer. To increase input/output (I/O) throughput, the memory system may quickly program a large amount of data into the SLC buffer, not an MLC memory block, regardless of the attribute or the type of data, because the SLC buffer has a better operation margin than the MLC memory block. Or, the memory system may program plural pieces of data into the SLC buffer based on their attribute only. Thereafter, the memory system may perform the garbage collection to the SLC buffer so that valid data stored in the SLC buffer may be transferred to the MLC memory block based on the attribute and the type of data. Data stored in the MLC memory block by the garbage collection can be classified according to the attribute and the type of data, so that an operation state, a lifespan, and wear/damage regarding the MLC memory block can be easily managed and controlled. These procedures can improve performance of the memory system.

As described above, the memory system according to an embodiment of the disclosed technology can support a multi-stream in a memory block and uses the multi-stream for a data program operation. Operation efficiency of the memory system may be improved through data write operation and garbage collection based on the multi-stream.

In an embodiment of the disclosed technology, a data processing system, a method for operating the data processing system and a method of controlling an the operation in the data processing system can provide a memory system which is capable of providing at least one data stream corresponding to characteristics or attributes of each data classified or determined by a controller, thereby improving operation efficiency, a lifespan or durability of the memory system.

In addition, a memory system according to an embodiment of the disclosed technology can effectively manage (e.g., not dramatically increase but, if feasible or possible, reduce) the number of open memory blocks in the memory device while providing multi streams corresponding to data characteristics, thereby simplifying the operation of the controller controlling the memory device. It can improve performance.

While the present teachings have been illustrated and described with respect to the specific embodiments, it will be apparent to those skilled in the art in light of the present disclosure that various changes and modifications may be made without departing from the spirit and scope of the disclosure as defined in the following claims.

What is claimed is:

1. A memory system, comprising:
a memory device including plural memory blocks, each memory block including plural pages and each page including plural non-volatile memory cells, wherein each memory block includes a group of non-volatile memory cells erased together and each page includes a group of non-volatile memory cells read or programmed together; and
a controller coupled to the memory device and configured to select a target memory block among the plural memory blocks, the target memory block including a first page to an N page (N is a positive integer), and program data in the target memory block, based on a type of the data, either in a first direction from the first page to the N page or in a second direction from the N page to the first page, wherein the controller is further configured to check, during the programming of the data, whether more than one empty page in which no data is programmed exists in the target memory block, and in response to a check result that there is not more than one empty page in the target memory block, the controller is further configured to select another target memory block among the plural memory blocks.

2. The memory system according to claim 1, wherein the controller is configured to select the target memory block based on an attribute of the data.

3. The memory system according to claim 2, wherein the type of the data is determined based on whether the data is user data or meta data, and the attribute of the data is determined as one of hot, warm, or cold based on a frequency to access to the data.

4. The memory system according to claim 2, wherein the type of the data is determined based on whether the data is user data or meta data, and the attribute of the data is determined as one of hot, warm, or cold based on a frequency to access to the data or as one of long or short based on a frequency to update the data.

5. The memory system according to claim 1, wherein the controller is configured to program a piece of the data in the first direction and program another piece of the data in the second direction.

6. The memory system according to claim 1, wherein the controller is further configured to select a victim memory block among the plural memory blocks and perform a garbage collection operation on data stored in the victim memory block based on at least one of a type or an attribute of the data.

7. The memory system according to claim 6, wherein the controller is further configured to move the data stored in the victim memory block to either a first open memory block or a second open memory block depending on the data has been programmed in the first direction or the second direction.

8. The memory system according to claim 7, wherein the controller is further configured to check whether all pages in the first open memory block are programed.

9. The memory system according to claim 8, wherein the controller is further configured to select another victim memory block among the plural memory blocks in a response to a checking result that there is a blank page in the first open memory block, and perform the garbage collection on data stored in another victim memory block.

10. A method for operating a memory system, comprising:
selecting a target memory block among plural memory blocks, each memory block including plural pages, each page including plural non-volatile memory cells, wherein each memory block includes a group of non-volatile memory cells erased together and each page includes a group of non-volatile memory cells read or programmed together; and performing a program operation to program data in the target memory block based on a type of the data either in a first direction from a first page to an N page (N is a positive integer) of the target memory block or in a second direction from the N page to the first page, wherein the selecting the target memory block comprises:
determining whether the target memory block includes more than one empty page in which no data is programmed, and selecting, in response to the determination that target memory block includes not more than one empty page, another target memory block among the plural memory blocks.

11. The method according to claim 10, further comprising:
determining the type of the data based on whether the data is user data or meta data.

12. The method according to claim 10, further comprising:
determining an attribute of the data inputted with a request for the program operation.

13. The method according to claim 12, wherein the determining of the attribute of the data is made based on a frequency to access the data or a frequency to update the data.

14. The method according to claim 10, wherein the performing of the program operation includes programming a piece of data in the first direction and programming another piece of data in the second direction.

15. The method according to claim 10, further comprising:
selecting a victim memory block among the plural memory blocks; and performing a garbage collection operation on pieces of data stored in the victim memory block based on at least one of types or attributes of the pieces of data.

16. A method for operating a memory system, comprising:
selecting a target memory block among plural memory blocks, each memory block including plural pages;

performing a program operation to program data in the target memory block based on a type of the data either in a first direction from a first page to an N page (N is a positive integer) of the target memory block or in a second direction from the N page to the first page;

selecting a victim memory block among the plural memory blocks; and performing a garbage collection operation on pieces of data stored in the victim memory block based on at least one of types or attributes of the pieces of data, wherein the performing of the garbage collection operation includes moving some pieces of data into a first open memory block or a second open memory block depending on the pieces of data have been programmed in the first direction or the second direction.

17. The method according to claim 16, further comprising:
determining whether all pages in the first open memory block are programed.

18. The method according to claim 17, further comprising:
selecting, in response to the determining that there is a blank page in the first open memory block, another victim memory block among the plural memory blocks; and performing the garbage collection on pieces of data stored in the another victim memory block.

* * * * *